US006920511B2

(12) United States Patent
Sicola et al.

(10) Patent No.: US 6,920,511 B2
(45) Date of Patent: Jul. 19, 2005

(54) METHOD AND APPARATUS FOR CONTROLLING COMMUNICATIONS IN DATA STORAGE COMPLEXES

(75) Inventors: Stephen J. Sicola, Palmer Lake, CO (US); Bruce Sardeson, Colorado Springs, CO (US); Dennis Spicher, Monument, CO (US); Bruce Roberts, Colorado Springs, CO (US); Bill Pagano, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 515 days.

(21) Appl. No.: 10/086,599

(22) Filed: Oct. 19, 2001

(65) Prior Publication Data

US 2003/0079074 A1 Apr. 24, 2003

(51) Int. Cl.[7] .......................... G06F 13/00; G06F 13/14
(52) U.S. Cl. ...................................... 710/100; 710/305
(58) Field of Search ................................ 710/100, 305; 711/112, 114; 361/685, 724

(56) References Cited

U.S. PATENT DOCUMENTS

| | | | |
|---|---|---|---|
| 5,109,318 A | 4/1992 | Funari et al. | |
| 5,184,281 A | 2/1993 | Samarov et al. | |
| 5,513,314 A | 4/1996 | Kandasamy et al. | |
| 5,790,782 A | * 8/1998 | Martinez et al. | ............ 714/53 |
| 5,815,371 A | 9/1998 | Jeffries et al. | |
| 5,815,649 A | 9/1998 | Utter et al. | |
| 5,822,777 A | 10/1998 | Leshem et al. | |
| 5,832,222 A | 11/1998 | Dziadosz et al. | |
| 5,835,700 A | 11/1998 | Carbonneau et al. | .... 395/183.2 |
| 5,938,776 A | * 8/1999 | Sicola et al. | .................. 714/25 |
| 5,956,665 A | * 9/1999 | Martinez et al. | ............ 702/188 |
| 5,987,622 A | 11/1999 | Lo Verso et al. | |
| 5,996,089 A | 11/1999 | Mann et al. | |
| 6,038,689 A | 3/2000 | Schmidt et al. | |
| 6,073,209 A | 6/2000 | Bergsten | |
| 6,148,414 A | 11/2000 | Brown et al. | |
| 6,188,973 B1 | 2/2001 | Martinez et al. | ............ 702/188 |
| 6,237,112 B1 | 5/2001 | Yoo et al. | ...................... 714/30 |
| 6,243,790 B1 | 6/2001 | Yorimitsu | .................... 711/112 |
| 6,260,120 B1 | 7/2001 | Blumenau et al. | |
| 6,266,721 B1 | 7/2001 | Sheikh et al. | ................ 710/100 |
| 6,278,609 B1 | 8/2001 | Suzuki et al. | |
| 6,282,094 B1 | 8/2001 | Lo et al. | |

(Continued)

OTHER PUBLICATIONS

Smart Storage Inc., "SmartStor InfiNet™: Virtual Storage for Today's E–economy," Sep. 2000.
Compaq Computer Corporation, "The Compaq Enterprise Network Storage Architecture: An Overview," May 2000.
Compaq Computer Corporation, "Compaq Storage Works" Data Replication Manager HSG80 ACS V8.5P Operations Guide, Mar. 2000.

*Primary Examiner*—Glenn A. Auve
*Assistant Examiner*—Nimesh Patel

(57) ABSTRACT

A controller for positioning on a shelf of a cabinet within a mass storage system for controlling communication among device enclosures in a reporting group. The controller includes an interface to a data communication loop linking device enclosures each including disk drives positioned on one or more cabinets. The interface is used to transmit control commands. A cabinet bus interface controller is provided and linked to a cabinet bus in the cabinet to receive enclosure reporting messages from the device enclosures to collect environment information. The cabinet bus interface transmits reporting messages onto the cabinet bus to provide environmental information. The interface controller determines the shelf location of the controller within the cabinet from signals on the cabinet bus and receives the cabinet identifier over the cabinet bus. A processor is linked to the interface controller and functions to create and issue the control commands to the loop interface.

31 Claims, 14 Drawing Sheets

U.S. PATENT DOCUMENTS 6,282,096 B1   8/2001   Lo et al.
6,282,610 B1   8/2001   Bergsten
2002/0010883 A1 *  1/2002   Coffey et al. ................ 714/712
2002/0133736 A1 *  9/2002   Faber et al. ................... 714/5

* cited by examiner

| SHELF ID | BITS 7..4 | BITS 3..1 | BIT 0 |
|---|---|---|---|
| 1 | 1110 | 110 | 0 |
| 2 | 1110 | 110 | 1 |
| 3 | 1101 | 101 | 0 |
| 4 | 1101 | 101 | 1 |
| 5 | 1011 | 011 | 0 |
| 6 | 1011 | 011 | 1 |
| 7 | 0111 | 110 | 0 |
| 8 | 0111 | 110 | 1 |
| 9 | 1110 | 101 | 0 |
| 10 | 1110 | 101 | 1 |
| 11 | 1101 | 011 | 0 |
| 12 | 1101 | 011 | 1 |
| 13 | 1011 | 110 | 0 |
| 14 | 1011 | 110 | 1 |
| 15 | 0111 | 101 | 0 |
| 16 | 0111 | 101 | 1 |
| 17 | 1110 | 011 | 0 |
| 18 | 1110 | 011 | 1 |
| 19 | 1101 | 110 | 0 |
| 20 | 1101 | 110 | 1 |
| 21 | 1011 | 101 | 0 |
| 22 | 1011 | 101 | 1 |
| 23 | 0111 | 011 | 0 |
| 24 | 0111 | 011 | 1 |
| CABINET CABLE DISCONNECTED | 1111 | XXX | X |
| CABINET CABLE DISCONNECTED | XXXX | 111 | X |

| BYTE | BIT 7 | BIT 6 | BIT 5 | BIT 4 | BIT 3 | BIT 2 | BIT 1 | BIT 0 |
|---|---|---|---|---|---|---|---|---|
| 0 | PROTOCOL NUMBER ||||||||
| 1 | 00H CONFIGURATION STATUS PAGE FORMAT REVISION |||| 80H GENERAL CONTROL PAGE FORMAT REVISION ||||
| 2 | TYPE=0 |||| REV ||||
| 3 | |||||||||
| 4 | ERROR CODE ||||||||
| 5 | SUB-ERROR CODE ||||||||
| 6 | FRAMEWORK SOFTWARE REVISION ||||||||
| 7 | APPLICATION SOFTWARE REVISION ||||||||
| 8 | NUMBER OF STATUS PAGES=4 ||||||||
| 9 | NUMBER OF CONTROL PAGES=7 ||||||||
| 10 | STATUS PAGE 00H ||||||||
|    | LENGTH=32 ||||||||
| 11 | SEMAPHORE | NEW DATA | | | FORMAT REVISION=1 ||||
| 12 | CONTROLLER INTERFACE STATUS PAGE=01H ||||||||
|    | LENGTH=16 ||||||||
| 13 | SEMAPHORE | NEW DATA | | | FORMAT REVISION=1 ||||
| 14 | CONTROLLER INTERFACE PAGE 02H REPORTING GROUP PARTICIPATION ||||||||
|    | LENGTH=22 ||||||||
| 15 | SEMAPHORE | NEW DATA | | | FORMAT REVISION=0 ||||
| 16 | CONTROLLER INTERFACE PAGE 03H DRIVE BYPASS STATUS ||||||||
|    | LENGTH=6 ||||||||
| 17 | SEMAPHORE | NEW DATA | | | FORMAT REVISION=0 ||||
| 18 | CONTROLLER INTERFACE GENERAL CONTROL PAGE 80H ||||||||
|    | LENGTH=1 ||||||||
| 19 | SEMAPHORE | NEW DATA | | | FORMAT REVISION=0 ||||
| 20 | CONTROLLER INTERFACE MODULE CONTROL PAGE 81H ||||||||
|    | LENGTH=1 ||||||||
| 21 | SEMAPHORE | NEW DATA | | | FORMAT REVISION=0 ||||
| 22 | CONTROLLER INTERFACE LCD CONTROL PAGE 82H DRIVE ||||||||
|    | LENGTH=1 ||||||||
| 23 | SEMAPHORE | NEW DATA | | | FORMAT REVISION=0 ||||
| 24 | CONTROLLER INTERFACE NON-VOLATILE CONTROL PAGE 83H ||||||||
|    | LENGTH=5 ||||||||
| 25 | SEMAPHORE | NEW DATA | | | FORMAT REVISION=0 ||||
| 26 | CONTROLLER INTERFACE DRIVE BYPASS PAGE 84H ||||||||
|    | LENGTH=6 ||||||||
| 27 | SEMAPHORE | NEW DATA | | | FORMAT REVISION=1 ||||
| 28 | CONTROLLER INTERFACE REVISION INFO CONTROL PAGE 85H ||||||||
|    | LENGTH=4 ||||||||
| 29 | SEMAPHORE | NEW DATA | | | FORMAT REVISION=0 ||||
| 30 | CONTROLLER INTERFACE DRIVE BYPASS RESTART CONTROL PAGE 86H ||||||||
|    | LENGTH=3 ||||||||
| 31 | SEMAPHORE | NEW DATA | | | FORMAT REVISION=0 ||||

FIG. 11

| BYTE | BIT 7 | BIT 6 | BIT 5 | BIT 4 | BIT 3 | BIT 2 | BIT 1 | BIT 0 |
|---|---|---|---|---|---|---|---|---|
| 0 | QUESTIONABLE | TABLE OVERFLOW | FAILED | RESERVED =0 | REPORTING GROUP NUMBER | | | |
| 1 | QUESTIONABLE | RESERVED=0 | FIRST ENCLOSURE PARTICIPATING IN THE REPORTING GROUP ENCLOSURE NUMBER | | | | | |
| 2 | CABINET NUMBER | | | | | | | |
| 3 | QUESTIONABLE | RESERVED=0 | SECOND ENCLOSURE PARTICIPATING IN THE REPORTING GROUP ENCLOSURE NUMBER | | | | | |
| 4 | CABINET NUMBER | | | | | | | |
| 5 | QUESTIONABLE | RESERVED=0 | THIRD ENCLOSURE PARTICIPATING IN THE REPORTING GROUP ENCLOSURE NUMBER | | | | | |
| 6 | CABINET NUMBER | | | | | | | |
| 7 | QUESTIONABLE | RESERVED=0 | FOURTH ENCLOSURE PARTICIPATING IN THE REPORTING GROUP ENCLOSURE NUMBER | | | | | |
| 8 | CABINET NUMBER | | | | | | | |
| 9 | QUESTIONABLE | RESERVED=0 | FIFTH ENCLOSURE PARTICIPATING IN THE REPORTING GROUP ENCLOSURE NUMBER | | | | | |
| 10 | CABINET NUMBER | | | | | | | |
| 11 | QUESTIONABLE | RESERVED=0 | SIXTH ENCLOSURE PARTICIPATING IN THE REPORTING GROUP ENCLOSURE NUMBER | | | | | |
| 12 | CABINET NUMBER | | | | | | | |
| 13 | QUESTIONABLE | RESERVED=0 | SEVENTH ENCLOSURE PARTICIPATING IN THE REPORTING GROUP ENCLOSURE NUMBER | | | | | |
| 14 | CABINET NUMBER | | | | | | | |
| 15 | QUESTIONABLE | RESERVED=0 | EIGHTH ENCLOSURE PARTICIPATING IN THE REPORTING GROUP ENCLOSURE NUMBER | | | | | |
| 16 | CABINET NUMBER | | | | | | | |
| 17 | QUESTIONABLE | RESERVED=0 | NINTH ENCLOSURE PARTICIPATING IN THE REPORTING GROUP ENCLOSURE NUMBER | | | | | |
| 18 | CABINET NUMBER | | | | | | | |
| 19 | QUESTIONABLE | RESERVED=0 | TENTH ENCLOSURE PARTICIPATING IN THE REPORTING GROUP ENCLOSURE NUMBER | | | | | |
| 20 | CABINET NUMBER | | | | | | | |

FIG.13

METHOD AND APPARATUS FOR CONTROLLING COMMUNICATIONS IN DATA STORAGE COMPLEXES

BACKGROUND OF THE INVENTION

1. Field of the Invention

The present invention relates, in general, to computer systems and mass data storage systems and subsystems, and more particularly, to a system and method for controlling communications among devices, such as device enclosures and included environmental monitoring units (EMUs), within a multi-cabinet mass storage system to facilitate monitoring and control of groups of such devices positioned within one, two, or more cabinets.

2. Relevant Background

In the computer industry, there is ongoing and increasing demand for data storage systems with more capacity as well as improved reliability. The use of RAID (Redundant Arrays of Inexpensive Disks) systems has significantly enhanced data storage reliability by providing redundancy, i.e., failure of one system component does not cause loss of data or failure of the entire system. Although initially RAID systems generally provided redundant disk drives, more functional redundancy has recently been provided by extending redundancy to device enclosures. These enclosures may include a number of components such as power supplies, cooling modules, disk devices, temperature sensors, audible and/or visible alarms, and RAID and other controllers. To provide functional redundancy, the enclosure typically includes an extra one of each of these components that is needed for proper functionality. For example, two power supply units may be provided such that if one fails the remaining power supply unit is capable of providing adequate power.

The data storage industry has struggled with how best to provide efficient and uniform communication throughout the data storage system. These communication problems have made it difficult to monitor and control the devices and enclosures within each cabinet. Mass storage systems typically include numerous multi-shelf cabinets or racks each holding multiple enclosures. The systems are adapted for replacement of individual enclosures to upgrade or modify the system or in some cases, to service an enclosure but a system of collecting status information and controlling operation of each device is required to manage the systems. Often, control devices such as array controllers are used to control the transfer of environmental data from the devices and to issue control commands to the devices, and a management tool such as a host computer with or without a graphical user interface (GUI) is provided to allow a system operator to manage device operations through the array controllers.

Communication is generally controlled by each array controller within a cabinet, i.e., a controller or other management tool is provided for each array or grouping of devices within the cabinet. The controller communicates with each of the devices on the shelves of a particular cabinet to collect environmental information, such as temperature and power usage, and to issue control commands to each device. The control and communications are often not uniform as each array controller may be configured to utilize different messaging protocols to communicate with the devices in its cabinet or array and there is typically no communications provided between devices in different cabinets. Each controller may be linked to a management device, such as a personal computer with a graphical user interface (GUI), which further adds to the complexity and cost of the system. Providing uniform control over the system devices is difficult because accessing all the devices requires operating all of the management devices and/or communicating with all of the array controllers even when the array controllers are physically located within the same cabinet. Additionally, it is difficult to allow sharing of resources between cabinets as each cabinet is typically serviced by different array controllers and/or management devices with different communication protocols.

Hence, there remains a need for an improved method and system for controlling communications between devices within a data storage complex and particularly, within a multi-cabinet mass storage system. Preferably, such a method and system would support the presentation of uniform information and error messages simultaneously across all cabinets within the system, would enable monitoring and controlling of all or most of the devices in the system from a single device or by a single entity, and would have device and subsystem isolation and monitoring capabilities but would not detrimentally effect controller performance or create a single failure point (i.e., retain redundancy of system).

SUMMARY OF THE INVENTION

The present invention addresses the above discussed and additional problems by providing a communication control system and method for use in a mass storage complex having a number of multi-shelf cabinets. The management system and method allows arrays of disk drives or enclosure devices to span multiple cabinets, minimizes the single points of failure, and enables a single device or controller to be able to obtain environmental data by addressing any drive on a communication link (e.g., a fibre channel loop) while, at least in some embodiments, fully satisfying the SCSI Enclosure Services (SES) specifications (such as the sub-enclosure reporting specifications). The communication system and method comprises dividing device enclosures on shelves of one or more cabinet into reporting groups and providing a controller (or array controller pair) for each reporting group. The controllers are linked to each of the device enclosures with a data loop (such as a fibre channel loop). The controllers include a processor and a cabinet bus interface controller that are adapted to operate in cooperation to obtain environmental data by addressing any drive in a device enclosure on the data loop and obtain environmental data about the enclosures for all drives within the loop from a single point.

More particularly, a controller is provided for positioning on a shelf of a cabinet within a mass storage system for controlling communication among device enclosures in a reporting group. The controller includes an interface to a data communication loop, such as a fibre channel loop. A number of device enclosures each including disk drives or other computing devices are linked to the data communication loop and may be located in the same or different cabinets. The device enclosures and controller combined create a reporting group. The interface is used to transmit control commands. In some cases, a management tool or GUI host may be linked to the loop to issue commands messages to the controller and to receive environmental information for the reporting group from the controller.

The controller further includes a cabinet bus interface controller linked to a cabinet bus in the cabinet to receive enclosure reporting messages from the device enclosures.

The enclosure reporting messages are typically received from a primary reporting device which is a device enclosure appointed by the controller to collect environmental information for the reporting group and to receive the control commands. The cabinet bus interface is further configured to transmit subenclosure reporting messages onto the cabinet bus to provide environmental information for the controller. The interface controller further functions to determine the shelf location of the controller within the cabinet from signals on the cabinet bus and to receive the cabinet identifier over the cabinet bus.

A processor is linked to the interface controller and functions to create and issue the control commands to the loop interface. The interface controller acts as or emulates a memory image on the link to the processor, such as read only memory, non-volatile read/write memory, and read/write memory. In the read only memory, the interface controller stores the cabinet identifier, the shelf identifier, and the assigned reporting group number. The interface controller monitors these values and other operating status fields within the emulated memory image and transmits interrupt signals to the processor upon changes to these values, fields, or portions of the fields (e.g., bits within a byte field).

BRIEF DESCRIPTION OF THE DRAWINGS

FIG. 4 is a table illustrating shelf identifiers obtained using an eight-wire arrangement in a cabinet cable;

FIG. 11 is a data structure utilized to implement an interfacing protocol for the cabinet bus interface controller of FIG. 8 utilized in some preferred embodiments instead of the emulated memory image interface of FIG. 9;

FIG. 13 is an exemplary data structure for a CBIC interface page for reporting group participation.

DETAILED DESCRIPTION OF THE PREFERRED EMBODIMENTS

The present invention is directed toward a method of managing communications among the components of a multi-cabinet or rack data storage complex. More particularly, the present invention addresses the need for a specially configured controller, such as a RAID or array controller, useful within groups of computing devices such as device enclosures to enhance monitoring and collection of environmental data (SES data) and transmittal of command signals. The controller of the invention is adapted to communicate with devices within a single cabinet via a cabinet cable or bus and with devices in different cabinets via a cabinet communication network linking cabinets and cabinet busses in such cabinets. The communication control method of the invention also calls for a useful messaging system with protocols that are standard throughout the data storage complex to enable uniform messaging and broadcasting of environmental and command sets to any device in the complex. One preferred embodiment of the invention arranges device enclosures and a pair of controllers into reporting groups to facilitate communication within a cabinet and among cabinets.

Figure 8:
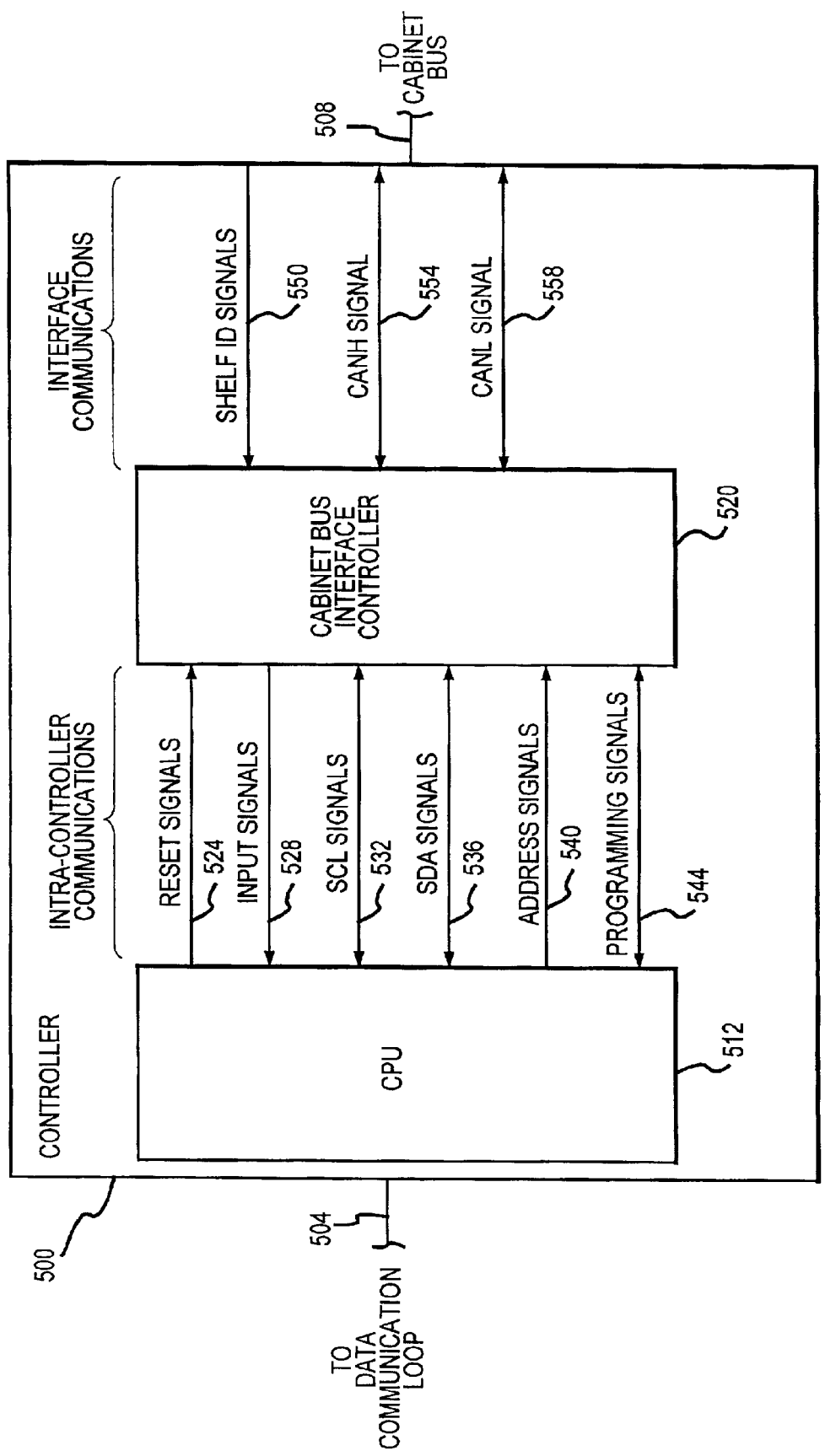
FIG. 8 is a functional block diagram illustrating an exemplary array controller useful in the systems of FIGS. 1, 5, and 6 showing signal flow between the controller processor and the cabinet bus interface controller.
Figure 9:
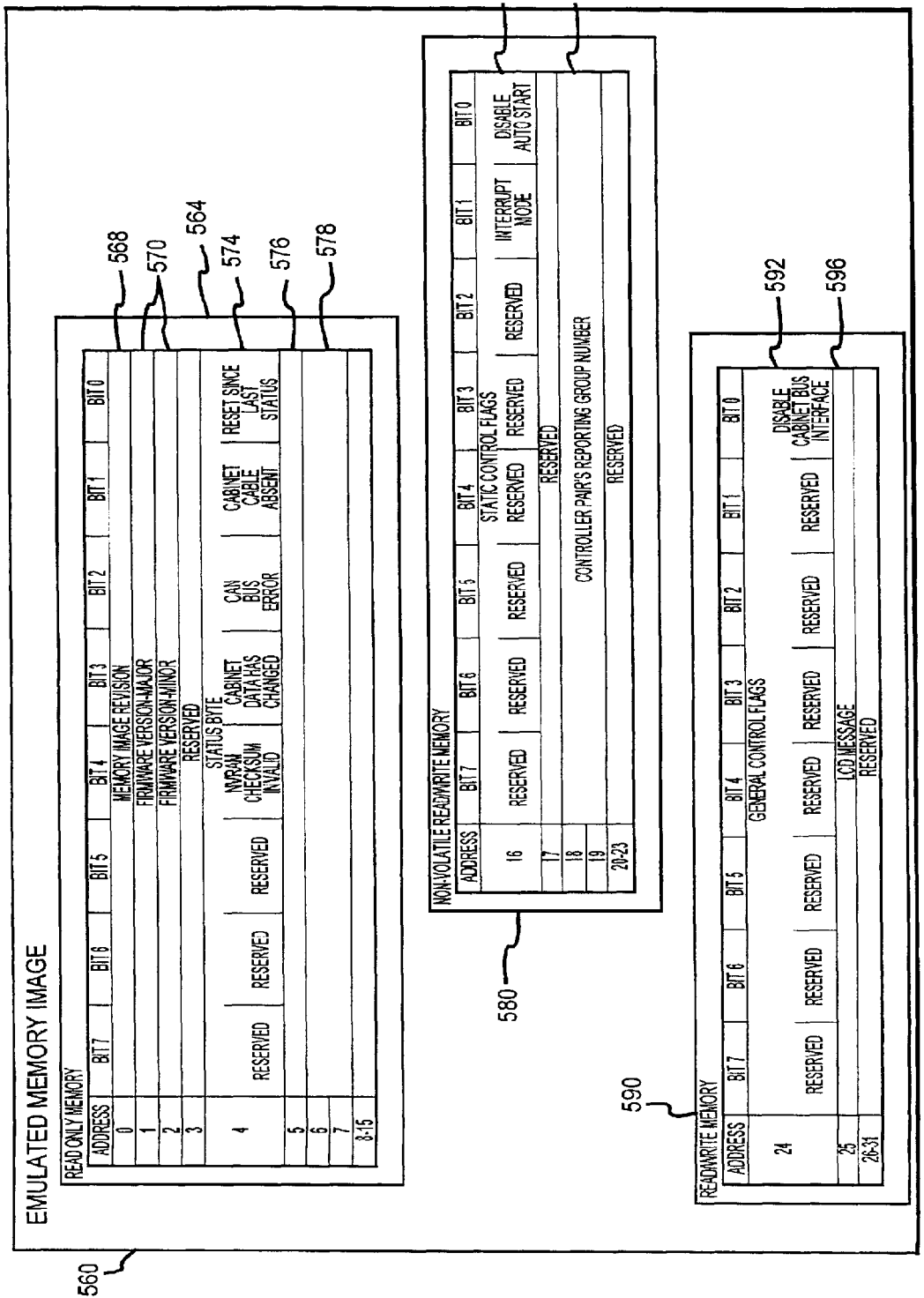
FIG. 9 illustrates an emulated memory image provided by the cabinet bus interface controller of FIG. 8 to the controller processor.
Figure 10:
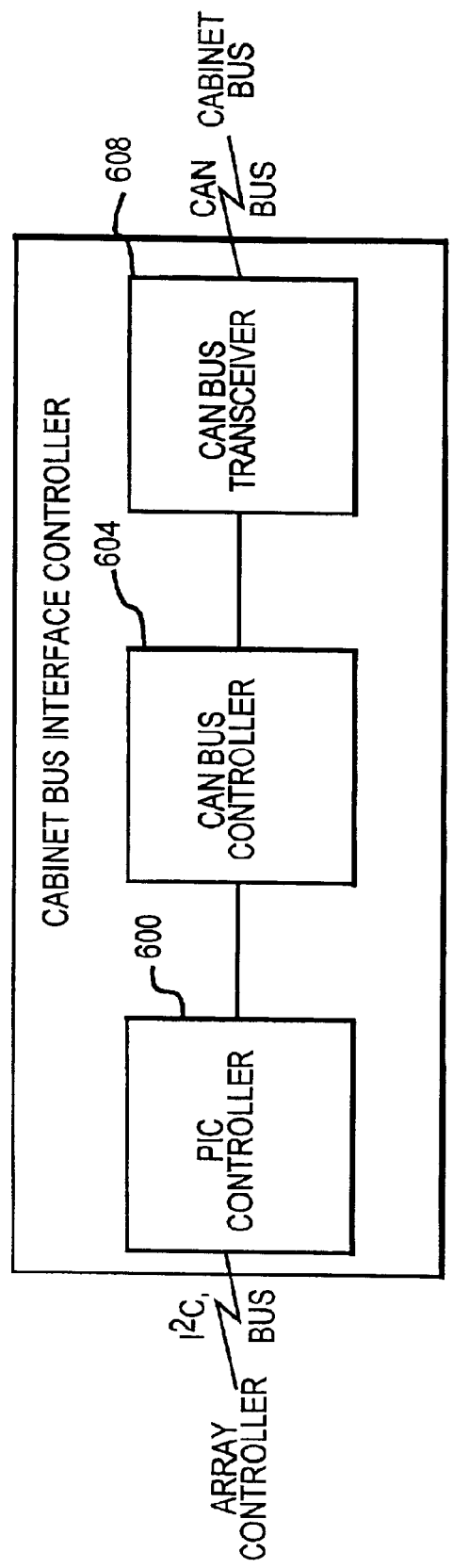
FIG. 10 is a block diagram of the cabinet bus interface controller (CBIC) of FIG. 8 useful for explaining communication controls and pin/port assignments.

To fully explain unique features of the communication control provided by the controllers and other components of the invention, the following discussion will begin with a discussion of a data storage system that provides one method of sensing or determining the cabinet and shelf of each device enclosure which is useful in supporting the reporting group concept of the invention. This initial discussion also provides a description of one preferred arrangement for a device enclosure with an EMU that can be used in combination with controller pairs of the invention in processing and broadcasting messages within the management system. An explanation of the reporting group concept is then provided to emphasize the need for the specially configured controllers of the invention. With reference to FIGS. 8–10, the communication control method and controller configurations of the present invention are next described in detail. The communication and control features of the invention may be utilized with different position sensing systems (e.g., nearly any technique may be used to provide the shelf and cabinet information to the EMU of the enclosure) and with arrangements of computing devices placed in cabinets not utilizing the reporting group concepts but including out-of-band communications similar to or differing from the cable bus arrangement described below.

Figure 1:
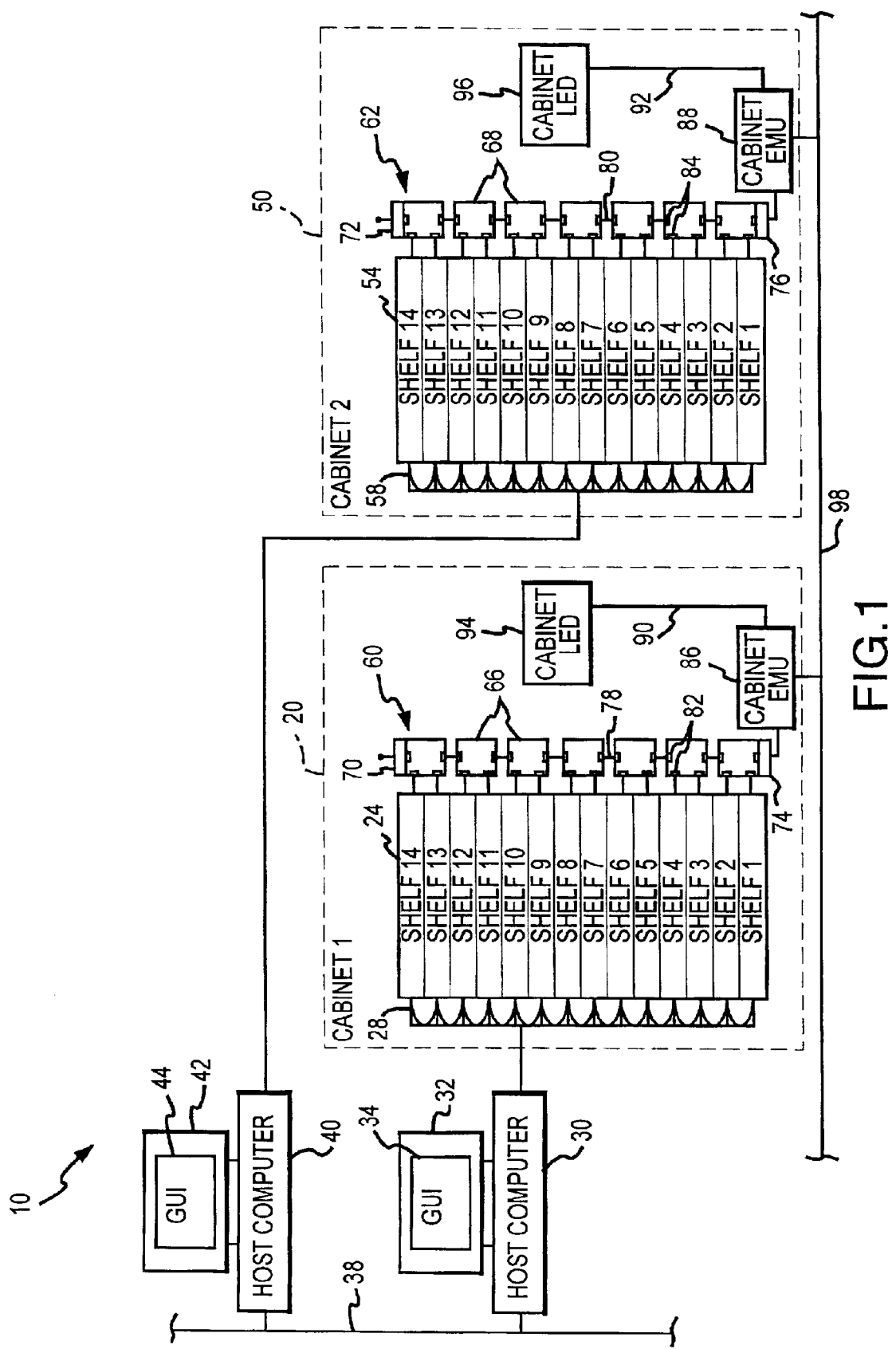
FIG. 1 is an illustration of a data storage system or complex with cabinets having multiple shelves incorporating a cabinet cable that provides position detection useful with the unified management system of the present invention.
Figure 5:
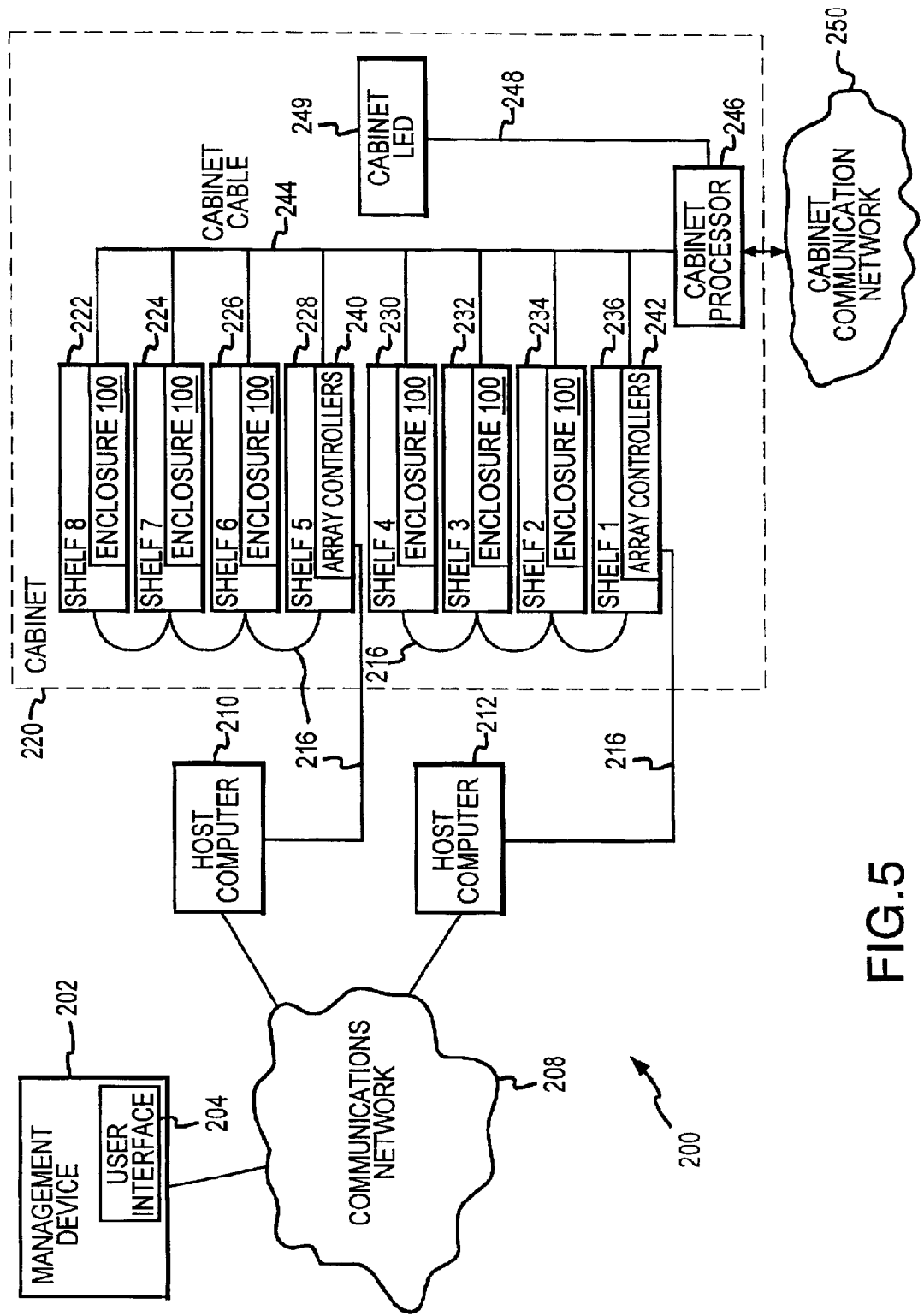
FIG. 5 is another exemplary portion of a mass storage complex illustrating one arrangement of a cabinet with two reporting groups including array controllers and hosts.
Figure 6:
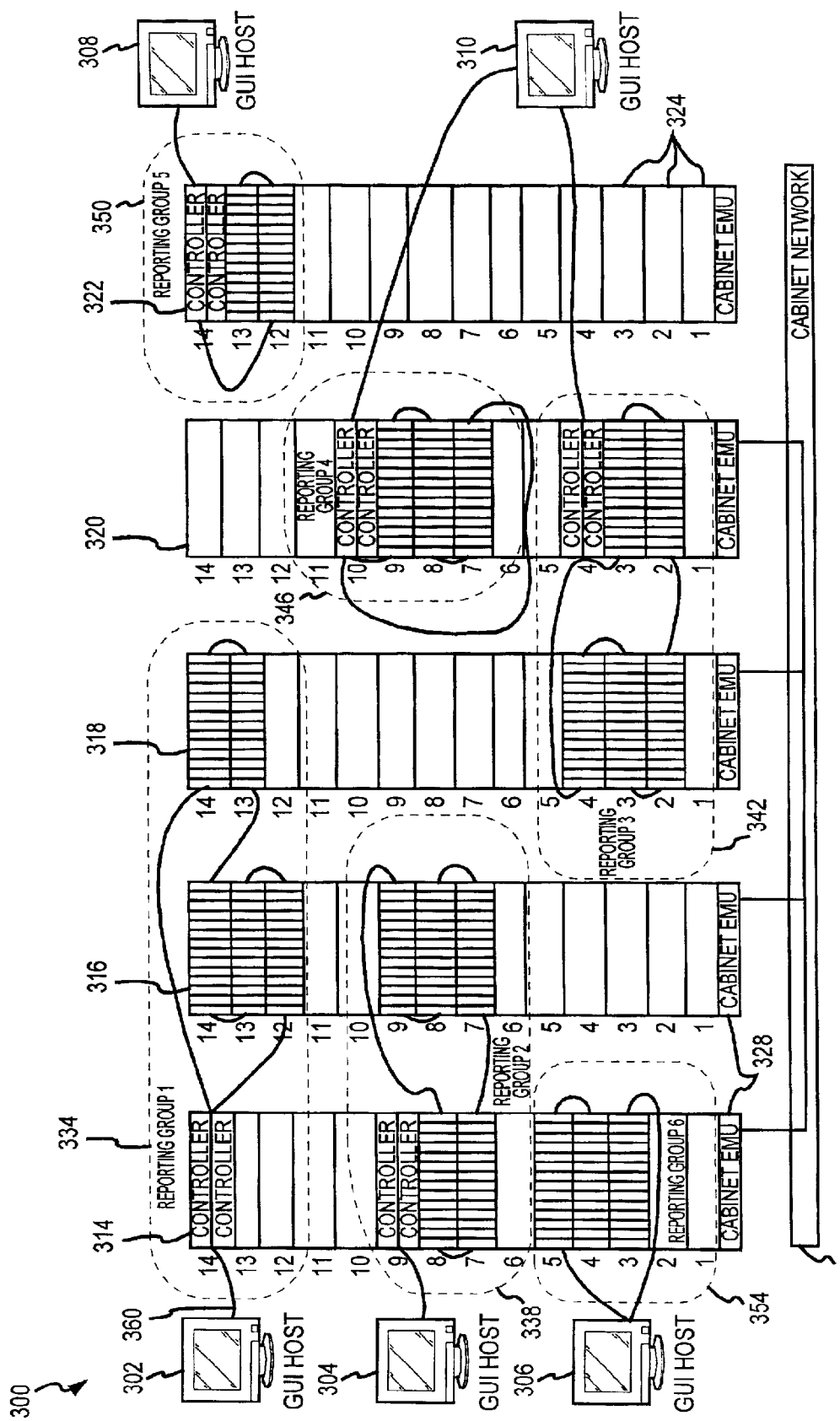
FIG. 6 is mass storage system arranged for unified management (i.e., by any GUI host or single device) illustrating that the present invention supports reporting groups within a single cabinet or spanning two or more cabinets and illustrating the use of cabinet processors or EMUs linked via a cabinet communications network to simultaneously broadcast device and enclosure information throughout the system and among cabinets.

FIG. 1 illustrates a data storage system 10 that provides components that function in combination to provide one technique of providing enclosure position sensing. As shown, the data storage system 10 has a first and second cabinet 20, 50 (although typical systems 10 may have many more cabinets 20, 50) each having a plurality of shelves 24, 54. The shelves 24, 54 or shelf locations are configured to allow an enclosure (such as the device enclosure 100 of FIG. 2) or other components to be plugged into and supported within the cabinet 20, 50. For example, a controller pair as shown in FIGS. 5 and 6 and explained in detail with reference to FIGS. 8–10 is preferably included in at least one of the cabinets 20, 50 to control communications in the system 10 among shelves 24, 54. Typical cabinet 20, 50 configurations call for 14 shelves 24, 54 although more shelves may be provided, such as up to 24 or more shelves 24, 54. If shelves 24, 54 are arranged vertically, a typical cabinet 20, 50 may have 24 shelves 24, 54 that each occupy a certain amount of rack space, such as 3 retma (U) (a standard mounting unit increment).

Each shelf 24, 54 (and more particularly, the enclosure 100 at a shelf location 24, 54) is linked to a fibre channel loop 28, 58 or other data link that enables access by and data flow to a host computer 30, 40. The data that is passed typically includes SCSI-3 Enclosure Services (SES) data and command sets and importantly, includes position information that identifies the shelf position and cabinet number or other identifier. The host computer 30, 40 may be a personal computer (PC), a server, or other computer or electronic device running software for allowing a user to access the position information (i.e., to receive the position information or signals from the fibre channel loops 28 and display or otherwise provide enclosure position information to the user). In one embodiment, the host computer 30, 40 includes a monitor 32, 42 and provides enclosure position information via a graphical user interface (GUI) 34, 44. The host computers 30, 40 are further linked to a communication network or bus, such as a company Ethernet, intranet, and the like, to allow information from enclosures on the shelves 24, 54 to be requested, retrieved, and transmitted to users at a location remote from the cabinets 20, 50.

Significantly, the cabinets 20, 50 include cabinet cables or busses 60, 62 that are configured to passively provide electrical signals to enclosures on the shelves 24, 54 that uniquely identify the position (typically vertical position) within the cabinet 20, 50. The cabinet cables 60, 62 also provide an out-of-band (external to any fibre channel loop) communication path between the shelves 24, 54 (as will be discussed further in relation to FIGS. 5 and 6 and 8–10). The cabinet cables 60, 62 are divided into a number of junction boxes 66, 68. As shown, each junction box 66, 68 is linked to two shelves 24, 54. Each junction box 66, 68 includes four connectors, such as RJ-45 connectors, for connection to the shelves 24, 54 and adjacent junction boxes 66, 68 and/or terminators. The cable 60, 62 further includes a top terminator 70, 72, and a bottom terminator 74, 76. The cabinet cable 60, 62 components are explained in more detail with reference to FIG. 3 that illustrates an exemplary wiring arrangement for a portion of the cable 60.

Each cabinet 20, 50 includes a cabinet EMU 86, 88 that provides cabinet information such as a cabinet identifier, cabinet type, and the like that is passed via the cabinet cable 60, 62 to the shelves 24, 54 for use by an enclosure in sensing or determining position of the enclosure within the system 10. In multi-cabinet systems 10, the cabinet EMU 86, 88 typically also acts as a firewall and router for SES information. In this regard, the cabinet EMU 86, 88 is linked to a communication link or network 98 (such as a private Ethernet) that allows the EMU 86, 88 to broadcast SES data for all shelves or groups of shelves 24, 54 to other cabinet EMUs 86, 88. The cabinet EMU 86, 88 filters the received SES data and forwards it to the corresponding enclosures on shelves 24, 54 by group (e.g., the received SES data is rebroadcast via the cabinet bus 60, 62). The cabinet EMU 86, 88 also transmits signals to the cabinet LED display (and audio alarm) 94, 96 for displaying status information for enclosures on the shelves 24, 54.

Figure 2:
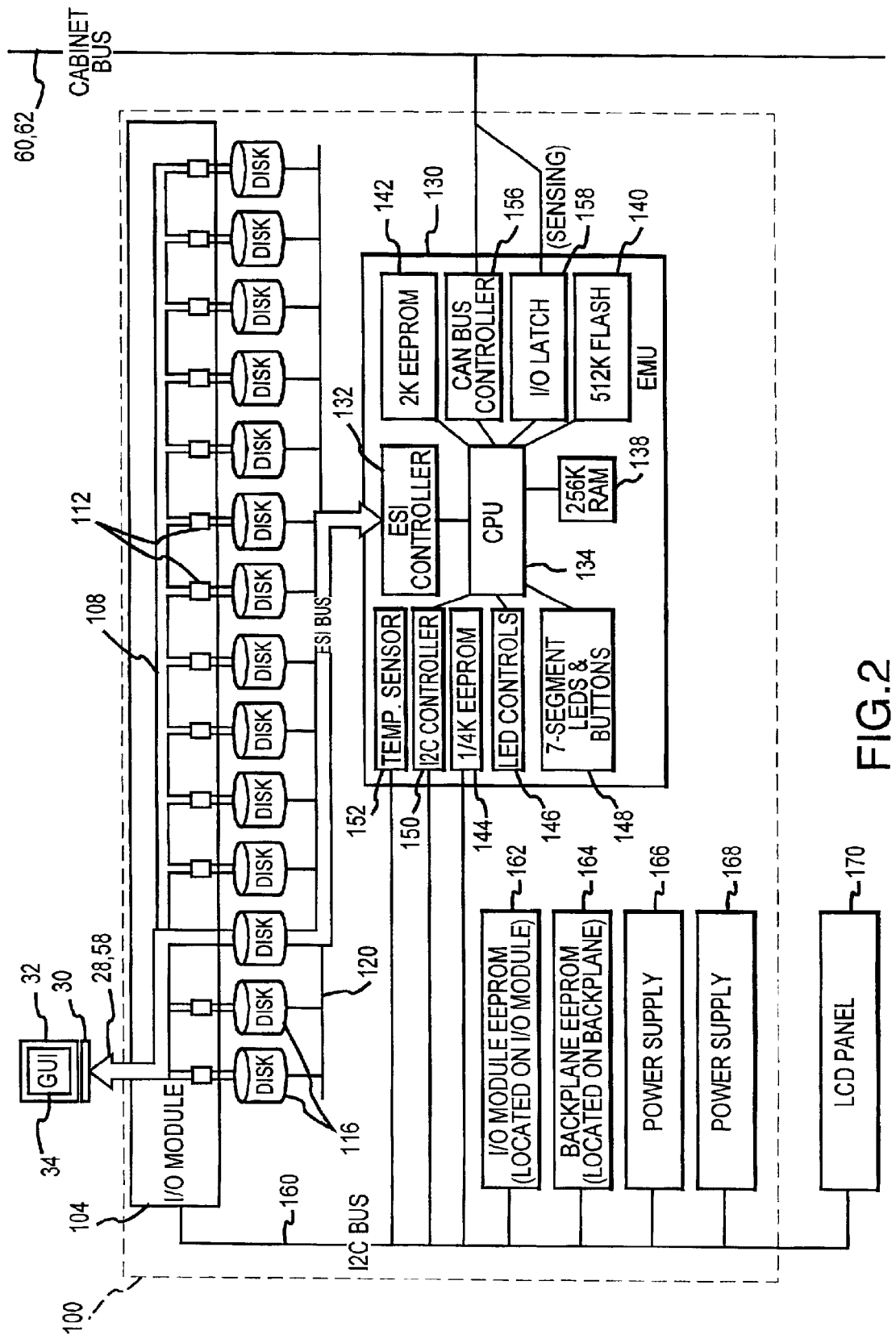
FIG. 2 is a simplified block diagram of an exemplary device enclosure that may be positioned on a shelf of the cabinets of FIG. 1.

FIG. 2 illustrates an exemplary device enclosure 100 that according to the invention is configured to receive passive position signals from the cabinet cable 60, 62, process the signals including the cabinet identifier from the cabinet EMU 86, 88 (or another component), transmit the enclosure position information in a signal to the host computer 30 (or 40), and communicate with controllers (such as the controller shown in FIG. 8). Note, the term shelf is often used for components within a cabinet 20, 50 such as an enclosure 100. In this application, shelf and shelf position is being used to identify a location, e.g., a vertical position, within a cabinet 20, 50 at which an enclosure 100 or other component (s) is connected or plugged in to the system 10.

The GUI host 30, 40 refers generally to any controller or host adapter capable of processing enclosure position signals and displaying (or otherwise reporting) the enclosure position to a user. The host typically will also be used to communicate SES data or pages via the fibre channel loop 28, 58 to and from the cabinets 20, 50. The highlighted path from the GUI host 30, 40 is used to show one exemplary path in the enclosure 100 for such SES data. The enclosure 100 is also linked directly to the cabinet cable 60, 62 to receive the cabinet identifier and shelf position information or identifier from the cable 60, 62 (as explained below).

The enclosure 100 includes an input/output (I/O) module 104 linked to the fibre channel loop 28, 58. The fibre channel loop 28, 58 is typically an arbitrated loop and although this diagram only shows one loop 28, 58 passing to (as shown by lines 108) the I/O module 104, the enclosure 100 may have two redundant loops with two I/O modules 104. The I/O module 104 acts as a communication interface to a plurality of disk devices or disk drives 116. Each I/O module 104 includes a bypass circuit 112 for each disk drive 116. The bypass circuit 112 can redirect the fibre loop 108 to include or exclude the disk drive 116 in the loop 108. If an EMU 130 is included in the enclosure 100, the EMU 130 can be used to control the bypass circuits 112 via the I/O module 104. If no EMU 130 is present, the I/O modules can be configured to control the bypass circuits 112.

A number of standard disk devices may be utilized for the disk drives 116 to practice the invention. For example, in one embodiment, the disk drives 116 are selected to conform to the "Enclosure Initiated ESI" option described in the "SFF Committee, SFF-8067 Specification for 40-pin SCA-2 Connector w/Bi-directional ESI," Rev. 2.6, Nov. 19, 1999. An Enclosure Services Interface (ESI) bus 120 is provided to facilitate position and SES data to be passed between the EMU 130 and the GUI host 30, 40. Preferably, the ESI bus 120 functions to allow the EMU 130 to provide enclosure position and SES data signals without occupying an address on the fibre channel loop 108 (although in some embodiments the EMU 130 may be directly linked to the host 30, 40).

As shown, the enclosure 100 includes an EMU 130 that primarily functions to process and broadcast SES data to the GUI host 30, 40 and/or the cabinet EMU 86, 88 (as will be discussed more with reference to FIGS. 5–7). The EMU 130 also functions to process and forward passive shelf identifier information and cabinet identifier information from the cabinet cable 60, 62. To this end, the EMU 130 includes an ESI controller 132, an EMU processor or CPU 134, and a controller area network (CAN) bus controller 156. Memory is provided for use by the CPU 134, and may take many forms such as that illustrated of RAM 138 (such as 256 K), flash memory 140 (such as 512 K), and EEPROM 142 (such as 2 K). FIG. 2 illustrates the cabinet cable or bus 60, 62 being connected to the CAN bus controller 156 to allow the EMU 130 to obtain the shelf identifier signal. In other embodiments not shown, the EMU 130 may obtain the shelf identifier or number from other wires on the cabinet bus 60, 62 connected to other components of the EMU 130 or of the enclosure 100.

The EMU 130 further includes memory 144 in the form of ¼ K EEPROM that is typical of many printed circuit assemblies and may be used by the EMU 130 for storage of type and revision information, worldwide names, serial numbers, and similar information. LED controls 146 and an input and output display 148 are provided for operation by the EMU CPU 134. An I2C (Inter-Integrated Circuit) controller and temperature sensor 152 are provided and linked to the I2C bus 160 which provides a communication path for the EMU 130 to receive status information from and to send control information to all of the elements of the enclosure 100. The enclosure 100 further includes I/O module 104 memory 162 and backplane memory 164 linked to the I2C bus 160. Redundant power supplies 166, 168 are also provided and linked to the I2C bus 160. A LCD panel 170 for the enclosure 100 may also be provided and linked (by a RJ-45 connector or otherwise) to the I2C bus 160 for receiving control signals from the EMU 130.

The enclosure 100 passively receives electrical signals that it uses to determine a unique digital identifier for the shelf 24, 54 upon which the enclosure is positioned. This is achieved with the use of the cabinet bus 60, 62 that includes a series of junction boxes 66, 68 that each provide a unique shelf identifier for a set of shelves 24, 54 (such as for 2 shelves). The cabinet bus 60, 62 is comprised, in part, of wires that are divided into sensing sets or groups that work in combination to provide a single position signal that identifies the shelf 24, 54 (e.g., vertical position within the cabinet 20, 50). Two sensing sets are used along with alternate grounding and wire crossover between junction boxes 66, 68 to provide the passive signaling of shelf identifiers. Depending on the number of shelves 24, 54 to be identified in a cabinet 20, 50, numerous combinations of numbers of wires in each sensing set may be used such as sets of 5 and 2, 4 and 3, and the like.

Figure 3:
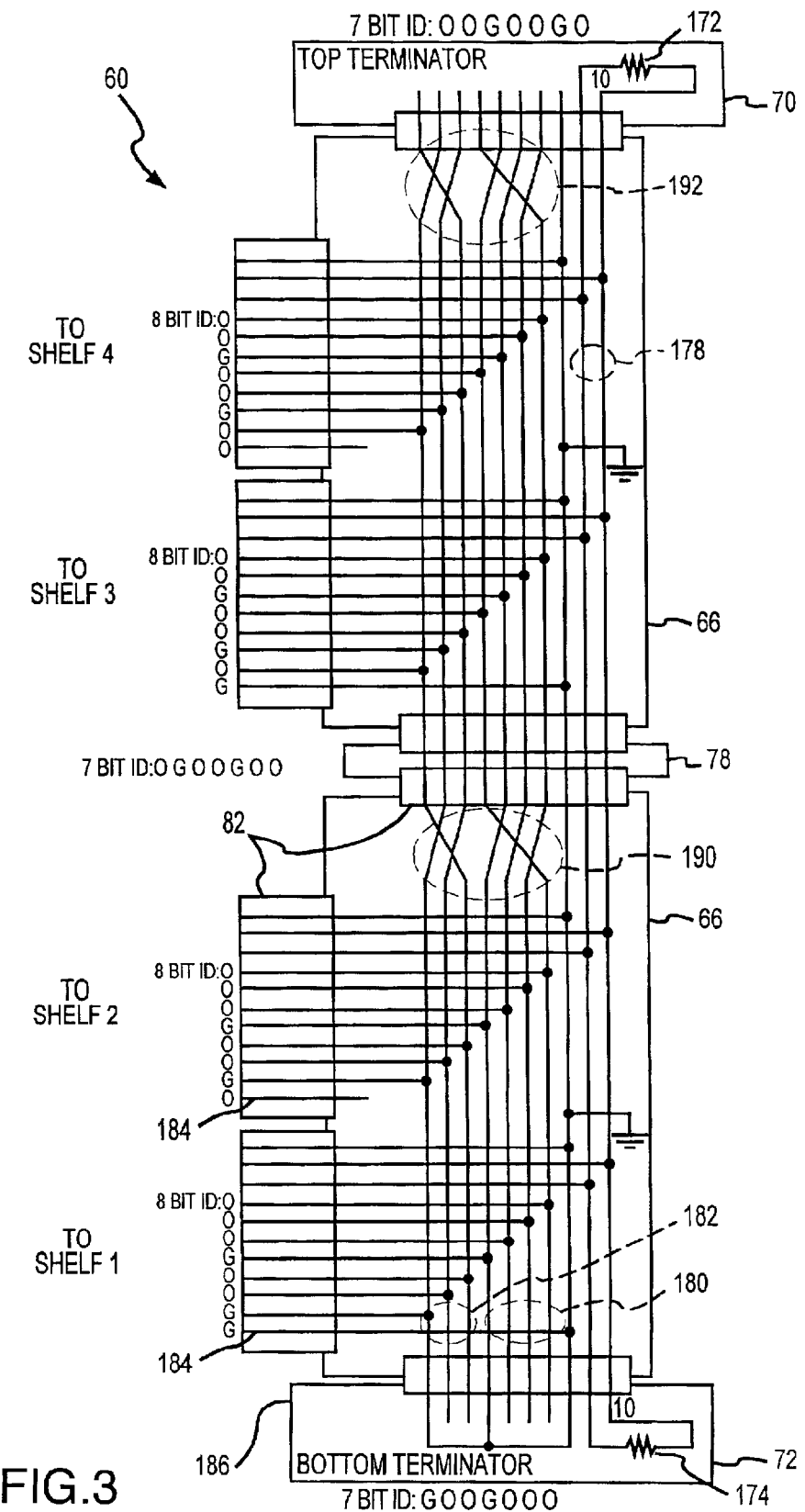
FIG. 3 is a wiring diagram of a portion of a cabinet cable illustrating a 3–4 wiring arrangement used in one embodiment to provide position detection by supplying unique digital identifiers to each shelf location in a cabinet.

FIG. 3 shows one preferred embodiment of a cabinet bus 60 that provides 24 unique shelf identifiers (as shown in tabular form in FIG. 4). A small portion of the cabinet bus 60 is provided illustrating only two junction boxes 66 although the number of junction boxes 66 typically will range between 7 and 12 for most cabinets 20, 50 to identify between 14 and 24 shelves 24, 54. The cabinet bus 60 has two main purposes: provide an identifier for an enclosure 100 location within the cabinet 20, 50 (such as vertical position in distances in units of 3U from the bottom of the cabinet 20, 50 and cabinet designation or identifier) and provide a communications path between the device enclosure EMUs 130 in the cabinet 20, 50 that does not conflict or compete with the data path 108 to drives 116 within the enclosures 100. The combination of the shelf location and cabinet designation provides complete enclosure position information that allows complete mapping or visualization of every enclosure 100 on shelves 24, 54 in the data storage system 10.

In the embodiment illustrated in FIG. 3, a ten-wire arrangement for the cabinet bus 60 is shown with seven wires being dedicated to passively providing the shelf location to the side connectors 82 in which enclosure 100 is connected (such as to EMU 130 via CAN bus controller 156). As shown, two wires are used for a CAN bus 178 and the remaining wire is used as a ground for the cabinet bus 60. The "horizontal" portion of the cabinet bus 60 is a stub that taps off the "vertical" portion at a specific location for a single shelf 24, 54.

The cabinet bus 60 is fabricated of modular pieces called junction boxes 66. Each junction box has four connectors 82, 84, such as RJ-45 connectors. Two connectors 82 (side or transverse connectors) are stubs that connect to two shelves 24, 54 (as shown with connectors 82, 84 to shelf 1 and shelf 2 for one junction box 66 and to shelf 3 and 4 for the second junction box 66). The other two connectors 82, 84 (end or inline connectors) function to enable the junction boxes 66 to be daisy chained to adjacent junction boxes 66 with an inter-junction cable 78, 80. In a typical cabinet 20, 50, each junction box 66 serves 2 shelves (or 6U of height in a 3U spacing arrangement) within the cabinet 20, 50. To facilitate operation of the CAN bus 178, terminating resistors 172, 174 (such as 120 ohm resistors) are provided at each end of the active bus 178. In one embodiment, the terminating resistors 172, 174 are contained in terminating plugs 70, 72 attached to the top and bottom junction boxes 66 in the cabinet bus 60.

The cabinet bus 60 includes a first and second sensing group of wires 180, 182 and a selectively grounded wire 184 that are dedicated to providing shelf identifier or position information to the side connectors 82 (and, connected enclosures 100). As shown, the first and second groups 180, 182 include a total of seven wires with the first group 180 including 4 wires and the second group 182 including 3 wires. At the bottom terminator 174 (in the bottom of the cabinet 20, 50), one wire from each group 180, 182 is grounded and the remaining wires in each group 180, 182 are left open or ungrounded. The signals from each wire in the groups 180, 182 are pulled up (and then combined and processed) in each EMU 130 in the shelves 24, 54 via the side connectors 82. The illustrated embodiment of cabinet bus 60 shows the starting bits (i.e., 7-bit initial ID) of an identifier signal being "OOGOOOG" (for open (O) or a 1 bit and ground (G) or a 0 bit) when the two sensing groups 180, 182 signals are combined sequentially (group 182 followed by group 180).

An eighth sense wire 184 is provided and added to the horizontal stub for each shelf 24, 54 in each junction box 66 (as shown, twice for each box 66). The additional sense wire 184 provides a binary value (or final bit) that is alternately grounded within each junction box 66 to provide a unique shelf identifier (ID) for each shelf 24, 54 within a box 66. As shown, the sense wire 184 is grounded on the first portion of the junction box 66 at 186 prior to tying to the side connector 82 but left open in the second portion of the junction box 66 prior to tying to the second side connector 82. In this example, the first shelf position identifier is the 8-bit ID of "OOOGOOGG" when the first and second sensing groups 180 and 182 are combined with the additional sense wire 184. The second shelf position identifier is differentiated by leaving the sensing wire 184 ungrounded and becomes the 8-bit ID of "OOOGOOGO." In this manner, the passive position sensing method of the present invention is able to uniquely identify each shelf 24, 54 in each junction box 66 although the same signal originates (from the starting 7-bit identifier) in the combination of the two sensing groups 180, 182.

To provide a unique identifier (e.g., 7-bit identifier) to each junction box 66, the passive numbering scheme utilizes numbers of wires for groups 180, 182 that are relatively prime, such as 3 and 4 in the illustrated embodiment. Significantly, the lines within each group 180, 182 are rotated or crossed-over as shown at 190 and 192 after the final side connector and at least before the next connection to the next junction box 66. In other words, each wire in each sensing group 180, 182 is moved one position within the group 180, 182 to present a new position code to the next junction box 66 along the cabinet bus 60 (including a last position to a first position). For example, as shown, the rotation or "next position" moving of the wires in the groups at 190 causes the initial position identifier signal to change from "GOOGOOO" to "OGOOGOO" and at 192 to change from "OGOOGOO" to "OOGOOGO."

In operation, the shelf ID is determined from the combined signals of the eight lines (TTL or other lines) of the first and second sensing groups 180, 182 and the additional sensing line 184 from the cabinet bus 60. The use of groupings of 3 and 4 lines (sets 182, 180) combined with an alternately grounded eighth line 184 provides 24 unique identifiers as shown in the table of FIG. 4. FIG. 4 further shows how for each segment of cable 60 corresponding to a junction box 66 the single binary bit of the alternating grounded wire 184 provides two unique shelf IDs. The larger cabinets 20, 50 generally have heights of less than about 42U, and each storage shelf 24, 54 occupies 3U with a pair of controller shelves/enclosures occupying another 3U of the cabinet height. Hence, typical cabinets 20, 50 contain 14 or less shelves 24, 54 and the 24 shelf IDs provided by the illustrated example is more than adequate.

A shelf ID of "0" is reserved to indicate the actual shelf position cannot be determined. Shelf IDs of 1 to 14 shown in FIG. 4 are used for shelves 24, 54 used for device enclosures 100 and indicate the height the shelf 24, 54 is from the bottom of the cabinet 20, 50. Shelf ID of "15" is reserved for a cabinet EMU with the other shelf IDs being reserved for expansion. As shown in the table of FIG. 4, the position signal provided by the cable 60 can also indicate a cabinet cable 60 is disconnected which occurs whenever every wire in either of the sensing groups 180, 182 is left open or ungrounded.

The enclosure 130 with the CPU 134 can process the received shelf ID signal from the side connector 82 to quickly look up or otherwise determine the shelf ID (which is typically a number of distance unit, such as 3Us, from the bottom of the cabinet 20, 50) and convert this to a four bit shelf ID (i.e., representing shelf IDs of 1 to 14). The cabinet identifier information, such as a cabinet number, from the cabinet EMU 86, 88, is unique number and in some embodiments is a unique 8-bit number. In operation, the EMU 130 operates to transmit the shelf ID and cabinet number in each message, such as in the message header, to allow the receiving device (e.g., the monitoring GUI host 30, 40 or another enclosure 100 in another cabinet 20, 50) to quickly identify and/or map the physical location of the enclosure 100 within the data storage system 10 by shelf 24, 54 and cabinet 20, 50. Of course, if no message is received from an EMU 130, the enclosure 100 is not present or in other words, if a shelf ID and cabinet number combination is not reported to the GUI host 30, 40 then that location would be considered open or available.

Figure 7:
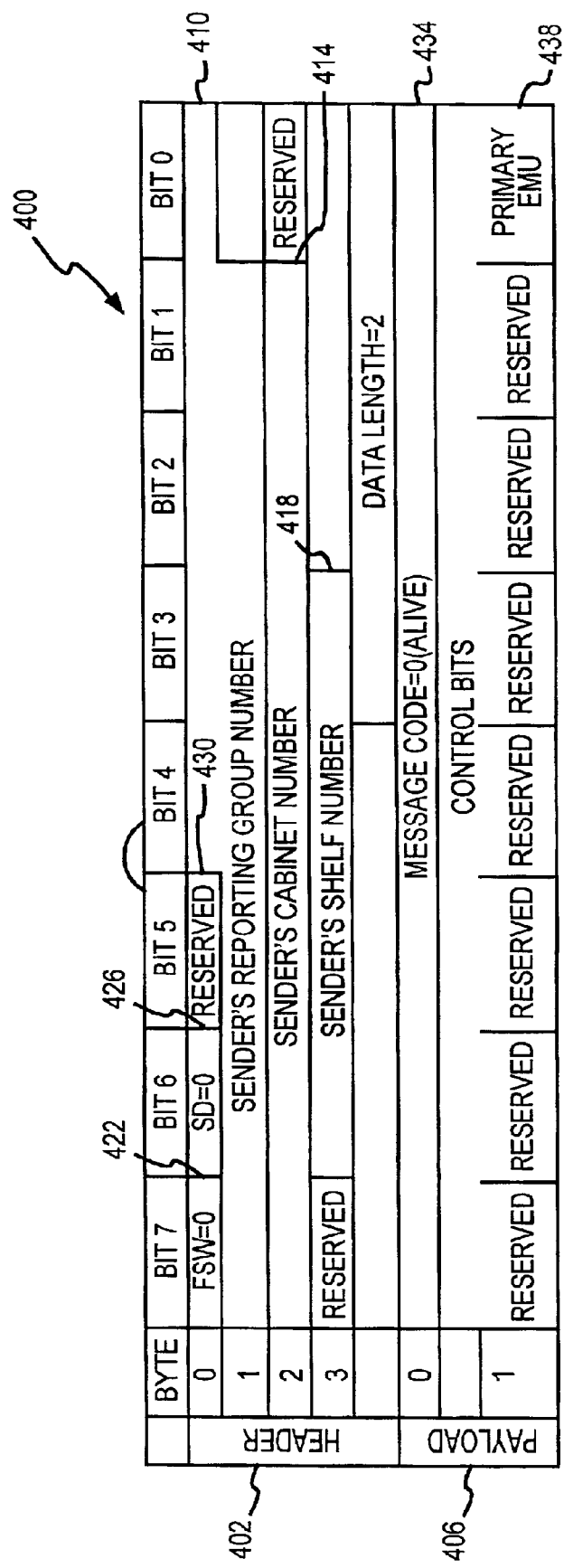
FIG. 7 illustrates one embodiment of a message header for use with the messages broadcast by the enclosure processors or EMUs and/or the cabinet processors or EMUs.

With an understanding of position sensing and of cabinet and enclosure structure, an exemplary unified management system and method is provided with reference to FIGS. 5–7. FIG. 5 illustrates a simplified mass storage complex 200 incorporating the unified management and communication control features of the invention. The system 200 provides for a single device in the management device 202 that can access and control each of the devices in the system 200. The management device 202, which may be a personal computer, a server, a laptop or handheld or any useful computing or electronic device, includes a user interface 204 (such as a monitor, mouse, keyboard, and GUI) to receive and display information to and from an operator at a single location. The management device 202 is linked to a communications network 208 which may include an Ethernet, an Intranet, the Internet, a LAN, a WAN, or other useful digital data communication network or link. As will become clear, the system 200 includes two reporting groups and as such, includes two host computers 210, 212 linked to and operable by command sets or signals by the management device 202 via the communications network 208. Again, the host computers 210 may be any of a number of useful computing devices, such as a PC, and preferably include a user interface, such as a GUI, for facilitating user operation and display of system information.

The host computers or GUI hosts 210, 212 are in turn communicatively linked to the cabinet or rack 220 and the components positioned therein by data link 216, which in one embodiment includes one or more fibre channel loops. The cabinet 220 shown is a simple configuration useful for explaining several of the important features of the invention. The cabinet 220 includes eight shelves 222, 224, 226, 228, 230, 232, 234, 236 adapted for physically supporting and communicatively linking computing and other devices. As illustrated, six of the shelves 222, 224, 226, 230, 232, 234 hold enclosures 100 (as shown in FIG. 2 or of other configurations) while two shelves 228, 236 hold controllers 240, 242 (such as array controller pairs provided for redundancy in typical RAID cabinets). One preferred arrangement of a controller is illustrated in FIG. 8 with its communication control features explained more fully with reference to FIGS. 9 and 10.

The system 200 components and communication links are arranged into reporting groups which facilitates unified management and enables placing of group components (such as device enclosures) in one or more cabinet. Communication is facilitated with the controller arrangement and messaging protocols of the invention. Reporting groups are explained fully with reference to FIG. 6. Briefly, however, the system 200 includes two reporting groups which are managed by the management device 202. One reporting group includes the enclosures 100 on shelves 222, 224, and 226 and array controllers 240 (such as the controller shown in FIG. 8) on shelf 228 and the second reporting group includes the enclosures 100 on shelves 232, 234, 230 and the array controllers 242 on shelf 236. The fibre channel loops 216 feeding each of shelves in each reporting group are separate. At the level of the fibre channel or communication loop 216, there is no interaction between the enclosures 100 and controllers 240, 242 of the two reporting groups. The controllers 240, 242 are responsible for assignment of the unique reporting group number or identifier to each of the enclosures 100 and in some embodiments, to the EMU 130 in each enclosure 100.

Significantly, all shelves 222, 224, 226, 228, 230, 232, 234, 236 in the cabinet 220 (and any other cabinet included in the system 200) are communicatively linked out-of-band of the data link 216. This may be provided within the cabinet 220 in a variety of ways. For example as illustrated, a cabinet cable 244 is linked to each of the shelves 222, 224, 226, 228, 230, 232, 234, 236 to allow messages to be communicated substantially simultaneously to each of the enclosures 100 and array controllers 240, 242 within a cabinet 220. Concurrent messaging is provided throughout the system 200 by inclusion of cabinet processors 246 linked to the cabinet cable 246 and a cabinet communication network 250, which is a data network, such as an Ethernet, linking all cabinets 220 in the system 200 to each other. As shown, all of the shelves 222, 224, 226, 228, 230, 232, 234, 236 share the cabinet cable 244 and the cabinet processor 246. In one embodiment, the cabinet cable 244 is configured similar to the cable shown in FIGS. 1 and 3 although other bus or link designs may be used to practice the invention and the cabinet processor 246 is configured as an EMU. The cabinet processor 246 further communicates with and operates a cabinet LED (and/or audio device) via link 248 (e.g., an I2C bus).

With this general understanding of the components of the system 200 understood, a discussion of data flow and collection paths, such as environmental reporting, in the system 200 is provided to highlight how unified management is provided in the system 200. Each enclosure 100 continually operates, typically via an included EMU 130, to collect environmental information for the components within the enclosure 100 (or on the shelf 222, 224, 226, 228, 230, 232, 234, 236). The collected information is then broadcast from the enclosures 100 over the cabinet cable or bus 244 to all members of the same reporting group. Each enclosure 100 (via its EMU 130) determines if the broadcast message is for its reporting group and ignores or filters out SES and/or other data originating from enclosures 100 or devices in different reporting groups. The environmental or SES data broadcast in the messages from each reporting group within a cabinet 220 shares the cabinet cable 244 bandwidth with only the other reporting groups within the cabinet 220. Some of this data or these messages may originate from a different cabinet 220 as will become clear from the following description.

Any enclosure 100 and enclosure EMU or processor 130 in each reporting group can be accessed directly by the management device 202 via the host computers 210, 212 and array controllers 240, 242 at any time via the fibre channel paths 216. Preferably, within each reporting group, one enclosure 100 or enclosure EMU 130 is assigned to be a primary reporting device (e.g., primary enclosure EMU 130) with the other enclosures 100 or enclosure EMUs 130 being secondary reporting devices. The assignment or selection of the primary reporting device is typically performed by array controllers 240, 242 within each reporting group and this selection can be arbitrary. In other words, any of the enclosures may be selected to be the primary reporting device and the designation can be changed during operation of the system 200 to support reconfiguration of the system 200 and/or maintenance.

The primary reporting device is responsible for responding to requests from the management device 202 and/or the host computers 210, 212 (via the user interface software) for environmental and/or other data pertaining to the entire reporting group or a portion of the group. The response from the primary reporting device typically will include data for all components and devices (e.g., for sub-enclosures) on the shelves 222, 224, 226, 228, 230, 232, 234, 236 of the reporting group for which the primary reporting device is assigned and may be formatted to satisfy various reporting and messaging protocols. The data includes the reporting group messages broadcast from each enclosure 100 in the reporting group within or outside the cabinet 220 and over the shared cabinet cable 244. In addition to collecting system data from a single device 202, management or control is achieved from a single management device 202 by issuing control commands to the host computers 210, 212 for a reporting group(s) which communicates the control commands to the primary reporting device (or primary EMU 130). The primary reporting device, in turn, processes the control command and forwards the processed control command to the target enclosure 100 or enclosure EMU 130 over the fibre channel loop 216.

The cabinet processor 246, such as an EMU, functions as a router of broadcast messages and data including environment information (e.g., SES information) and as a firewall for the devices within cabinet 220 linked to the cabinet cable 244. When the enclosures 100 broadcast or transmit messages on the cabinet cable 244, the cabinet processor or EMU 246 determines whether the messages (such as SES data) should be forwarded to other cabinets (not shown) attached to the cabinet communication network 250. In one embodiment, the cabinet processor 246 passes along all messages because reporting groups may scan two or more cabinets in the system 200. In another embodiment, the cabinet processor 246 performs a lookup or comparison of the reporting groups within the cabinet 220 to determine if any of the reporting groups span to other cabinets. If yes, the message or a portion of the message on the cabinet cable 244 is broadcast over the cabinet communication network to all cabinets or to the cabinets containing components or shelves within the reporting group. Otherwise, the message is not broadcast outside the cabinet.

In many embodiments, messages are broadcast over the cabinet communication network 250 to all cabinets and the cabinet processor 246 needs to function as a filter or firewall. In these embodiments, the cabinet processor or EMU 246 receives a broadcast or forwarded information, such as SES data. The cabinet processor 246 filters the received message and any information pertaining to reporting groups within the cabinet 220 is rebroadcast or forwarded to the cabinet bus or cable 244. The processors or EMUs 130 of each of the enclosures 100 on the shelves 222, 224, 226, 228, 230, 232, 234, 236 receives the rebroadcast information, determines if the information pertains to its reporting group (filtering out other reporting group information) and if applicable to its reporting group, stores the information (such as in memory 138, 140, 142 and the like). Note, the rebroadcast information appears as if it were transmitted within the cabinet 220 to the enclosure EMU 130. To provide fuller system information to the management device 202, the cabinet EMU 246 preferably creates and broadcasts messages such as SES data for itself as a sub-enclosure or device to the cabinet cable 244. Each enclosure, regardless of reporting group, within the cabinet 220 of the cabinet EMU 246 receives and stores the information and includes it as sub-enclosure information in reports provided by each primary reporting device.

As can be seen from the above description, the inclusion of the cabinet cable 244, its configuration, and the technique of linking it to each enclosure EMU 130 and array controller 240, 242 provides two important functions for the management system. First, the cabinet cable 244 may be configured to provide shelf identifiers as discussed with reference to FIGS. 1–3. Second, the cabinet cable 244 provides a communication path between the enclosure EMUs or processors 130 that is different from and does not conflict or compete for bandwidth with the data path 216 to the enclosure drives 116. For example, the controller area network (CAN) bus portion of the cabinet cable 244 may be used for these behind the disk device communications. The use of the cable 244 provides an "out-of-band" communication path that facilitates ongoing broadcasting of environmental and other information in messages throughout the system 200 and significantly, among all members of reporting groups whether the members or devices are in one or more cabinets 220 in the system 200. For the management system, the specific configuration of the cabinet cable 244 is not as important as its inclusion and its connection to each of the shelves within each cabinet 220 in the system 200.

The system 200 illustrated in FIG. 5 is useful for explaining data flow and connections within a cabinet 220. Referring now to FIG. 6, a multi-cabinet mass storage system 300 is provided to more fully explain the reporting group concept. As shown, five GUI hosts 302, 304, 306, 308, 310 are provided to communicate with a centralized management device (not shown but similar to the device 202 of FIG. 5) and to provide an access point to reporting groups and typically to controllers in each reporting group. The mass storage system 300 includes five cabinets or rack devices 314, 316, 318, 320, and 322 each having a plurality of shelves 324 for holding and linking computing devices such as controllers (e.g., array controller pairs of controllers shown in FIG. 8), device enclosures, and the like. The cabinets 314, 316, 318, 320, and 322 are each shown to have 14 shelves but the invention is useful in systems 300 having greater or fewer cabinets, with cabinets having greater or fewer shelves, and with systems 300 mixing cabinets with differing numbers of shelves and components on such shelves.

Cabinet processors, such as EMUs, 328 are provided in cabinets 314, 316, 318, and 320 to function as filtering devices and reporting group message routers (as described for processor 246 of FIG. 5). The cabinet processors 328 are linked to the cabinet network 330, such as an I2C bus, an Ethernet, a LAN, a WAN, or other network or communication bus, to provide a data flow path among reporting groups in different cabinets. A data path is provided between the GUI hosts 302, 304, 306, 308, 310 (such as computing devices running user interface and system monitoring software applications) and devices in the cabinets 314, 316, 318, 320, 322 by data links 360 (e.g., fibre channel loops).

As discussed previously, the unified management features provide single access points to data storage complexes, such as complex 300, and facilitate sharing components, such as device enclosures and controllers, located in one or more cabinet 314, 316, 318, 320, 322. To explain these features, the mass storage complex 300 is shown to have six reporting groups 334, 338, 342, 346, 350, 354 that are each configured differently to illustrate the flexibility provided with the use of reporting group arrangements and complex-wide message broadcasting or environmental/data reporting.

The first reporting group 1 is shown to include controllers on a shelf 324 of one cabinet 314 and device enclosures or data storage devices on shelves 324 of two other cabinets 316 and 318. The GUI host 302 is linked to the controllers in cabinet 314 and the controllers and device enclosure are linked by data paths 360. For the controller in cabinet 314 to be able to report environmental data for all of the storage devices in the first reporting group 334 to the GUI host 302, the controllers need to communicate with five storage devices in two different cabinets from the cabinet 314 in which it resides. This is achieved by the controller assigning one of the enclosures as the primary reporting device. For example, the enclosure processor or EMU of the enclosure on the twelfth shelf of cabinet 316 may be informed that it is the primary reporting device and is responsible for collecting environmental and/or other information from the other storage devices in the reporting group 334. As discussed, any enclosure or storage device may be designated as primary reporting device, which allows devices to be replaced and assigned to different reporting groups.

As shown in FIGS. 2 and 5, the processors or enclosure EMUs 130 of the enclosures 100 are not directly in the data path 360, e.g., fibre channel loops, which prevents the enclosure EMUs 130 from determining which array or data loop 260 they are connected to. The assignment of the enclosures to the reporting group 334, such as by assigning each of the five data storage devices in cabinets 316 and 318 an identical reporting group number or identifier (ID). Using the reporting group ID as an address, the two storage devices in cabinet 318 in reporting group 334 broadcast their environmental data or other information in a reporting message. The message is sent via a cabinet bus (such as cable 244 of FIG. 5) to the cabinet EMU 328 which transmits the message over the cabinet network 330 (which connects all cabinets 314, 316, 318, 320, 322 in the mass storage complex 300) to the cabinet EMU 328 in cabinet 316 (and in many embodiments, to all cabinets connected to the network 330).

This cabinet EMU 328 determines if the message is for a reporting group within the cabinet 316 and if so, rebroadcasts the message on the cabinet cable 244 of cabinet 316. The devices in reporting group 338 do not accept or ignore the message as not having their reporting group ID. The secondary devices in reporting group 334 in cabinets 316, 318 accept and store the information while the primary device on the twelfth shelf 324 of cabinet 316 accepts and stores the message. In a preferred embodiment, the primary reporting device via its EMU 130 typically will process the message to place all of the included environmental data into a message form dictated by reporting specifications and/or protocols (such as SES pages required by SES specifications) and then transfers these pages to the controller in cabinet 314 via the data path 360. These pages may be transferred on an ongoing basis as data is received from devices in the reporting group, on a predetermined periodic basis, and in response to requests from the controller or GUI host 302.

The mass storage complex 300 further includes a second reporting group 338 which is similar to the first reporting group 334 except that it only spans between cabinets 314 and 316. The second reporting group 338 is in communication with GUI host 304 via data path 360 attached to controllers in the ninth shelf of cabinet 314. Cabinet 314 includes two device enclosures on the seventh and eighth shelves 324 and cabinet 316 includes three device enclosures on the seventh, eighth, and ninth shelves 324 of cabinet 316. Any of the enclosure devices may be assigned to be the primary reporting device and the controller would receive consolidate pages containing environmental data from that primary reporting device, which gathers the information from messages broadcast on the cabinet cables of cabinets 314, 316 and the cabinet network 330. The third reporting group 342 of the complex 300 includes similar components as the second reporting group 338 but these components are located cabinets 318, 320 and are accessed and monitored via GUI host 310.

Although the management system and out-of-band communication path features of the invention are particularly useful in sharing devices among cabinets, the fourth reporting group 346 illustrates that all the devices of a particular group may be located within a single cabinet (such as cabinet 320). Within reporting group 346 a primary reporting device would still be designated by the controllers in the tenth shelf 324, messages would still be broadcast by the enclosure devices onto a cabinet cable (such as cable 244 shown in FIG. 5) and the cabinet EMU 328 of cabinet 320 would (in most embodiments) broadcast the messages onto the cabinet network 330. The cabinet EMUs 328 in the other cabinets 314, 316, and 318 would filter or block the messages though as not being applicable to reporting groups residing within their cabinets.

GUI host 310 is linked to the fourth reporting group 346 as well as reporting group 342. This illustrates that a single host device may be attached to more than one communication loop or data path 360 to enable a single device to manage more than one reporting group. Single device management may further be achieved by two or more of the GUI hosts 302, 304, 306, 308, 310 to a management tool (such as management device 202 of FIG. 5). Even with the use of a single host or management device, each reporting group 342, 346 requires assignment and retention of a primary reporting device to collect environmental information and to allow reporting group specific control commands to be directed to each reporting group (as these commands are processed and routed by the primary reporting device).

The fifth reporting group 350 of the complex 300 is illustrated to be positioned within a cabinet 322 that does not have a cabinet EMU 328 or a connection to the cabinet network 330. Without these components, the fifth reporting group 350 cannot be expanded to the other cabinets 314, 316, 318, 320 to share other complex 300 components. However, a primary reporting device is still assigned and messages are broadcast on the cabinet bus of cabinet 322 for receipt and collection by the primary reporting device. The primary reporting device passes this information to the controllers in the fourteenth shelf 324 of cabinet 322 for transmission via loop 360 to GUI host 308.

The sixth reporting group 354 is provided to illustrate that controllers such as array controllers are not required to practice the management method of the present invention. The enclosures or storage devices in reporting group 354 are under the direct control of the GUI host 306 (which is often the case for non-RAID devices, such as JBOD (Just a Bunch of Disks) devices and shelves). A primary reporting device would be assigned by the GUI host 306 and messages would be broadcast by the devices in the reporting group 354 within the cabinet 314 (and not over the network 330 if the cabinet EMU 328 acts as a filter for outgoing messages by only transmitting messages outside cabinet 314 for reporting groups having member or devices outside cabinet 314).

With further reference to the enclosure 100 of FIG. 2 and the storage system 200 of FIG. 5, the environmental reporting and system-wide concurrent broadcasting features (and messaging protocols) of the invention are more fully described. As previously discussed, the cabinet cable or bus 244 and cabinet communication network 250 combine to allow effective, out-of-band transfer of environmental and other data between enclosure processors or EMUs 130. The data is preferably formatted to an industry expected and accepted standard, such as, but not limited to, the "SCSI-3 Enclosure Services Command Set (SES)" specification. Whichever data formatting standard is used, it is preferable that the system 200 be able to support all or most of the defined formats or pages. In one embodiment, all pages defined under SES are supported by the system 200. This embodiment specifically uses the following SES pages: Supported Diagnostics ("0"); Configuration ("1"); Status and Control ("2"); Help Text ("3"); String In and Out ("4"); Threshold In and Out ("5"); Enclosure Descriptor ("7"); and Short Status ("8"). Preferably, each device that is included within a reporting group supports these pages with support of the Configuration and Status and Control pages being a minimum requirement for inclusion in a reporting group.

At system 200 (or 300) start up, each enclosure EMU 130 and cabinet EMU 246 on the cabinet cable 244 sends a copy of a set of its data pages (such as all of its environmental pages except the Supported Diagnostics) onto the cable 244. In steady state operations, each enclosure EMU 130 and cabinet EMU 246 typically sends an update when a particular page significantly changes, with a "significant change" being defined by the sending device (e.g., such a change may include all changes in current, voltage, and temperature other above a set threshold) or in some embodiments, the pages are resent periodically whether or not a change has occurred.

All environmental data pages for each reporting group are gathered by the assigned or designated primary reporting device (e.g., by the EMU 130 of such enclosure 100). All commands (e.g., Control, String In and Out, and Threshold In and Out pages) are sent to the primary reporting device (e.g., to the EMU 130 of the enclosure 100 acting as the primary device) by a host 210, 210 directly or via a controller 240, 242. The primary EMU 130 then parses the command data and forwards the appropriate portion to the secondary devices within the same reporting group (to the EMUs 130 of these enclosures 100) over the cabinet cable 244 and, if necessary, over the cabinet communication network 250.

Depending on data formatting specification being implemented within the system 200, the EMU 130 of the primary reporting device or enclosure 100 preferably performs some processing of the commands prior to transmitting the command pages or messages over the cabinet cable 244. For example, in an SES embodiment, the primary EMU 130 may be configured to process a Control page by breaking or dividing it into smaller Control pages or sub-pages. Such a division may be performed based on the sub-enclosure identification of each element in the combined Configuration page. Each sub-page is then sent only to the appropriate or indicated secondary devices via the cabinet cable 244 and/or cabinet communication network 250. The EMUs 130 of the secondary devices or enclosures 100 in turn perform a screening process to determine if the page identifies the proper reporting group and sub-enclosure (device) and in some cases, to complete a consistency check of the particular command to verify the command is an appropriate command for the devices within the enclosure 100.

The messages broadcast from each device in a reporting group and other sub-enclosures linked to cabinet cables 244 (such as cabinet EMUs 88, 246) may take a number of forms and include a variety of information. Preferably, each broadcast message includes at least the sending (or receiving for forwarding and control command messages) device's reporting group ID to allow a primary device to determine whether or not to collect the information and in many preferred embodiments the cabinet ID, and shelf identifier and/or location.

FIG. 7 illustrates one exemplary message 400 that may be broadcast by an EMU 130 of an enclosure 100, by a cabinet EMU 88, 246, or other device according to the management system of the invention. As shown, the message includes a header 402 and a payload 406 (e.g., a message content portion). The size in bits provided for each portion of the header 402 will typically vary depending on the CAN bus controller 156 or interface chip utilized in the enclosure processor 130 and cabinet processor 88, 246. For example, the illustrated extended message header provides 29 bits of header information and up to 8 bytes of data payload 406 per packet or message 400 (as is provided by the Philips SJA1000 Standalone CAN Controller). This has proven to be a useful message 400 arrangement but many other embodiments will be apparent to those skilled in the arts and are considered to be within the breadth of this disclosure and the following claims.

As illustrated, the header 402 includes the sender's reporting group ID or number 410 that allows a primary and secondary reporting devices to quickly determine if the message 400 on the cabinet cable 244 should be collected, processed, and stored or simply ignored (by a comparison with a reporting group ID in enclosure processor 130 memory). The reporting group ID (and grouping enclosures and devices in reporting groups) allows unitized storage system management and reduces the memory requirements for the enclosure EMUs 130 and CAN bus controllers 156. The illustrated message 400 shows the use of 12 of the header bits for the reporting group ID 410. These can be bits 1 to 7 of byte 1 and bits 0 to 4 of byte 0 (or other bytes). The CAN bus controller 156 acts as the filter for the EMU 130 by setting one of its acceptance filters to trigger on any message 400 that includes a value in the reporting group ID 410 portion of the message 400 that matches the receiving enclosure or node reporting group ID. If a match occurs, at least SES information in the payload 406 is accepted and stored by each enclosure EMU 130 (to allow any device to be the primary reporting device). Typically, a predetermined number or ID, such as "0", is reserved for the cabinet EMUs 88, 246 (which can be thought of as virtual members to all reporting groups within the same cabinet).

The message header 402 also includes the sender's cabinet identifier, e.g., number ID, 414. In the illustrated embodiment or messaging protocol the cabinet ID is 8 bits (bits 1 to 7 of byte 2 and bit 0 of byte 1). In one preferred embodiment, each cabinet EMU 88, 246 is configured with a unique 8 bit cabinet ID number and the ID number is available to all devices on the shelves of the cabinet linked to the cabinet cable 244. Each device or enclosure 100 stores this cabinet ID in memory and then uses this value in all messages 400 it sends. When no cabinet EMU 88, 246 is provided a zero value is used in messages 400.

The message header 402 further includes the sender's shelf identifier or location 418 which provides it position within the cabinet indicated by the cabinet ID 414. As illustrated, the shelf ID 418 is 4 bits (bits 3 to 6 of byte 3). In the positioning scheme presented in this disclosure, the shelf ID is a number (typically ranging from 1 to 14 or 1 to 24 or higher) that represents a number of distance increments, such as 3U, from the bottom of the cabinet. A shelf ID of zero is used if the position is not known or determined at the time the message 400 is to be sent. As can be appreciated, the inclusion of the cabinet number 414 and the shelf ID 418 provides a specific location of the reporting device within the storage complex 200, 300.

In addition to these components of the header 402, a format switch bit (FSW) 422 may be provided in the header 402 to indicate the format of the following message payload 406. For example, the bit may be set (at 1) when the payload 406 includes environmental information such as SES data used by primary EMUs 130 to provide sub-enclosure reporting to the controller 240, 242 or host 210, 212. Otherwise, the message payload 406 is a background message that is not always needed in reporting. A send diagnostic bit (SD) 426 may be provided to allow a primary EMU 130 to send SES Send Diagnostic pages to single enclosures 100 within a reporting group. Receive Diagnostic pages are typically sent to all enclosures 100 within a reporting group, but the send diagnostic bit 426 is set when the SES data in the payload 406 is part of a send diagnostic page. Additionally, reserved bits 430 are preferably provided to allow expansion of the unified management system. The message payload 406 may also take a variety of forms and the form shown is provided for illustration only not as a limitation. The payload 406 shown includes a message code section 434 that indicates the form and type of following data in the data section 438. This facilitates correct and more efficient message 400 processing by the enclosure EMU 130.

Now, with reference to FIGS. 8–14, the communication control method of the present invention will fully be explained. In one embodiment, the control method is carried out at least in part by controllers, such as array or RAID controllers, including an interface specially designed for attaching to the cabinet cable or bus 60, 62, 244 to facilitate collection and transmittal of environmental information and controlling devices on cabinet shelves. For redundancy, the controllers 240, 242 of FIG. 5 and controllers 314 of FIG. 6 are designed to operate as a cooperative pair of independent devices capable of handling all operations in the event one controller fails. A number of controller arrangements may be utilized to achieve the useful communication control features explained below. However, one preferred embodiment is described with reference to FIG. 8 for illustration and clarity purposes.

The controllers 240, 242, 314 may generally take the form of controller 500. As shown, controller 500 is in communication with a data communication loop (such as loops 28, 58, 108, 216, or 360) via link 504 to receive commands from management devices and to pass collected environmental information and in communication with a cabinet bus (such as busses 60, 62, 244) via link 508 to collect environmental information from (and transmit sub-enclosure environmental messages of its own to) other devices within its reporting group. The controller 500 includes a controller or processor (CPU) 512 and an independent interface to the cabinet bus provided by the cabinet bus interface controller 520. As is explained below, the cabinet bus interface controller 520 passes a number of intra-controller communication messages or signals to the CPU 512, such as over an I2C or other bus.

Significantly, the cabinet bus interface controller 520 acts in one embodiment to emulate a memory device (such as the emulated memory image 560 shown in FIG. 9) from the perspective of the CPU 512 and in another embodiment to implement an interfacing protocol data structure to the CPU 512 and cabinet bus 60, 62. In the emulated memory example, the cabinet bus interface controller 520 may be arranged to emulate a standard I2C memory device. The cabinet bus interface controller 520 is further preferably a flash programmable or other programmable device to allow new routines or firmware to be downloaded to the CPU 512 (such as from a management tool or GUI host device) and then into the interface controller 520. According to an important feature of the invention, the interface controller 520 communicates over the cabinet bus via link 508 using a unique messaging protocol (e.g., a controller area network (CAN) protocol) that provides uniformity to communications and messaging within storage complexes using the controllers 500. As with the enclosures of the invention, the cabinet bus interface controller 520 is preferably adapted for determining its shelf position and its cabinet (e.g., its identity) from the link 508 to the cabinet bus. Each of these features is more fully explained in the following discussion.

To explain the communication control features of the controller 500, intra-controller and interface communications are discussed more fully with continued reference to FIG. 8. As shown, the intra-controller communications include reset signals 524 from the CPU 512 to the interface controller 520. Asserting the reset signals 524 causes the cabinet bus interface controller 520 to be reset. The signal is typically active low, and a reset signal 524 typically is sent prior to or as part of in-circuit programming with programming signals 544 (e.g., the line is manipulated in concert with programming pins). Interrupt signals 528 are asserted by the interface controller 520 during operation to indicate the interface controller 520 has changed state. The CPU 512 may then obtain new and/or additional information from the interface controller 520. For example, an interrupt signal 528 may be asserted when a significant change has occurred in the environmental information for an enclosure in the same reporting group as the controller 500.

The intra-controller communications are typically adapted to meet an industry-accepted communication or bus specification and signals may pass between the CPU 512 and the interface controller 520 to comply with such a specification. For example, an I2C bus may be utilized and SCL signals 532 and SDA signals 536 provided to meet the specifications for 100 KHz operation. A number of address signals 540 are provided from the CPU 512 to set addressing bits of the interface controller 520. For example, in one embodiment, three address signals 540 are pulled up or down on the controller board 500 to set the lowest three bits of the interface controller 520 I2C slave address (with the upper four bits of the I2C slave address being hard coded to, for example, 0xA).

The interface communications are important for providing the cabinet bus interface controller 520 with an identity. Typically, this is performed with shelf ID signals 550 from the cabinet bus via link 508. For example, the link 508 may be to a connector 82 in cable 60 shown in FIG. 3 which enables the interface controller 520 to determine its shelf location within a cabinet. The cabinet identifier typically is gathered as part of the CANH and CANL signals 554, 558 from a cabinet EMU or processor. In this fashion, the interface controller 520 can identify the physical location of the controller 500 within a storage system.

Additionally, the controller 500 is assigned to a particular reporting group at installation and linked via fibre channel loops to devices and/or enclosures within that same reporting group. For example, with reference to FIG. 6, the controllers (which may have a configuration as shown in FIG. 8) in the fourteenth shelf 324 of cabinet 314 are assigned to a reporting group 334 and linked with data loop 360 to all of the devices in the reporting group 334 (in cabinets 316 and 318). The cabinet area network high (CANH) signals 554 and cabinet area network low (CANL) signals 558 are differentially driven signals to and from the cabinet bus via link 508 which provide shelf to shelf communications within the cabinet and provide communications with devices in other cabinets via a cabinet network and the cabinet busses.

According to another important aspect of the invention, the cabinet bus interface controller 520 of one embodiment emulates a memory device or image from the controller 500 CPU 512. This emulated image may take a number of useful forms to practice the invention, such as an I2C memory device adapted for supporting block write. More specifically, in one embodiment, the interface controller 520 emulates a 256-byte memory device on the I2C bus from the CPU 512. One exemplary memory image 560 emulated by the interface controller 520 is shown in FIG. 9. The memory image 560 is shown (with memory maps) to be divided into read only memory 564, non-volatile read/write memory 580, and read/write memory 590 (although other divisions may be used and other types of memory provided in addition to those shown).

Addresses provided in the read only memory 564 are read only and writes to these address are ignored with no error. The values at these addresses are preserved when power is cycled. The number and content of the fields may be varied with those shown being only one useful embodiment. As shown, a memory image revision field 568 is provided for storing the revision of the memory structure (e.g., the revision of the emulated memory image 560). The firmware revision fields 570 provide two byte locations for storing the interface controller 520 firmware version. The status field 574 is used to store status information pertaining to the interface controller 520.

Significantly, the cabinet bus interface controller 520 interrupts the CPU 512 by sending interrupt signals 528 to the CPU 512 when these fields or bits of these fields change. The interrupt established by the signals 528 has two modes, with the particular interrupt mode being controlled by an interrupt value in a field (e.g., a bit) in the non-volatile read/write memory 580 (as discussed below). As shown, the status byte field 574 includes a bit that is set when the interface controller 520 starts up after a reset (such as upon an external reset or when the interface controller 520 resets itself due to internal errors) and this bit is cleared when the status field 574 is read. A cabinet cable absent bit is provided in the status field 574 and is set when the cabinet cable or bus is either not plugged in or is broken. An interrupt signal 528 is sent whenever this bit changes state. The status field 574 further includes a CAN bus error bit that is set when an error is detected via the CANH and CANL signals 554, 558 or by other methods that the interface controller 520 cannot communicate with the other devices in its cabinet. The CPU 512 is interrupted for each occurrence of this condition. A bit is also provided to indicate when cabinet data has changed, such as when the shelf ID has changed as indicated or determined by the shelf ID signals 550 or when the cabinet identifier or number changes (which may occur when the controller is moved within a storage complex). Again, the CPU 512 is interrupted upon these changes. The status field 574 further includes a NVRAM checksum invalid field or bit that is set when the data stored in the non-volatile read/write memory 580 is invalid or corrupted. To clear this bit, the CPU 512 rewrites the read only memory 564 fields.

The read only memory 564 further includes a shelf ID field 576 for storing the shelf identifier (indicating the physical location of the controller 500 within a cabinet) as determined by the shelf ID signals 550. The cabinet number field 578 is used to store a unique cabinet number or identifier, which is typically received via the cabinet bus from an included cabinet processor or EMU. If a cabinet processor or EMU is not provided in the cabinet holding the controller 500, this field 578 is set to zero.

Values may be written to and read from addresses in the non-volatile read/write memory 580. Values are preserved when power is cycled. Typically, a limited number of writes are allowed to each of these memory locations in memory 580 and writes that do not change these memory locations or fields are not performed. The static control flags 582 stores the static control bit mask when it is received and the settings indicated by bits in this field 582 affect the startup behavior of the interface controller 520 after a power on or after a reset. Specifically, the disable auto start bit may be set to cause the interface controller 520 to not attempt to communicate at power on via the cabinet bus with parameters stored in the non-volatile read/write memory 580 and also to cause the disable cabinet bus interface bit in field 592 of read/write memory 590 to be set. When the disable auto start bit is cleared and the NVRAM data image is valid, the interface controller 520 begins participating in cabinet bus communications via link 508 on power up and indicates the CPU 512 is in a boot state.

The static control flags field 582 further includes a bit used to control the operation of the interrupt pin which is used to inform the CPU 512 via interrupt signals 528 that status has changed. The two modes of interrupt operation can be labeled "pulsed" and "clear on read." In the pulsed mode (for example, mode bit set to one), when an interrupt signal 528 is to be sent (an interrupt is generated by the interface controller 520), the interrupt pin on the interface controller 520 is driven active for a period of time (such as for about 1 microsecond). One pulse is typically used for each interrupt signal 528 and external hardware is used to latch the interrupt pin as necessary for use by the CPU 512. In the clear on read mode (for example, mode bit set to zero), the interrupt line or pin is driven active continuously until the CPU 512 reads the status byte field 574 to determine the operating status that has changed or been updated.

The non-volatile read/write memory 580 also is shown to include a field 586 for storing the reporting group number assigned to the controller 500 (or controller pair). At power on, the controller pair reporting group number field 586 is initialized from the cabinet number value in field 578 of the read only memory 564.

The read/write memory 590 provides a number of addresses of RAM in which values can be written and read from and as such, any values stored in these locations are lost when power is cycled. As shown, a general control flags field 592 is provided having a disable cabinet bus interface. When this bit is set, the interface controller 520 ignores all cabinet bus communications. The disable cabinet bus interface bit is set when changes are made to the CPUs 512 operating parameters to provide consistency of the environmental or SES pages produced by the cabinet bus interface controller 520. When this bit is clear, the interface controller 520 participates normally in all cabinet bus communications. An LCD message field 596 is provided to allow selected messages to be displayed on the cabinet's LCD or LED panel (such as items 94, 96 of FIG. 1) by having the controller 500 passing the information or byte to the cabinet processor or EMU (such as EMUs of 86, 88). In one embodiment, the messages are predefined and are not modified by the CPU 512 but instead selected from the predefined messages. Generally, messages displayed to the cabinet LCD is an alternative messaging technique to report the failure of the CPU 512 or other portions of the controller 500. In other cases, an SES page or environmental information message is sent directly to the cabinet processor or EMU.

The specific arrangement utilized for the cabinet bus interface controller 520 may be varied to provide the described functions. FIG. 10 provides one useful arrangement in which a PIC controller 600, a CAN bus controller 604, and a CAN transceiver 608 is included in the cabinet bus interface controller 520. The PIC controller 600 is generally a programmable interrupt controller chip or device that prioritizes generated or requested interrupts and determines when and which interrupt signals 528 to send to the CPU 512.

The specific pin and communication assignments may vary but the following discussion of communication links is useful in better understanding data flow during messaging control by the cabinet bus interface controller 520. The PIC controller 600 is connected to the shelf signal wires of the cabinet bus (such as groups 180, 182 and grounding wire 184) to receive signals used to determine the shelf identifier or ID. The PIC controller 600 is further linked to the CPU 512 to provide the interrupt signals 528 to the CPU 512. This link is generally used only as an output and its operation is controlled or modified by the interrupt mode bit of the static control flags field 582 of the non-volatile read/write memory 580.

The PIC controller 600 is connected to the CAN bus controller 604. The CAN bus controller chip 604 interrupts the PIC controller 600 when bus errors occur, when message transmission is completed, and when messages are received. The CAN transceiver 608 is linked to the cabinet bus to receive the CANH and CANL signals 554, 558 and linked to the CAN bus controller 604. A number of pins of the PIC controller 600 are dedicated to providing an address/data bus between the PIC controller 600 and the CAN bus controller 604 and to implementing a memory bus handshake. The pins or bus is used for both input and output for the PIC controller 600 with read and write timings being established to control usage of the pins or bus.

The functions of the cabinet bus interface controller 520 can be provided with different useful interface techniques other than the memory emulation method described above. In one preferred embodiment, an interface (e.g., an API configuration or protocol) is implemented via a data structure 620. The data structure 620 is shown to include various header fields in a configuration page 622 that define such portions of the interface as a protocol number, the present revision of the status page format and the general control page format, the error codes, the framework and application software revision, and the number of status and control pages utilized. The configuration page 622 for the interface is followed in the data structure 620 by a number of controller interface status pages, such as status pages 624 and 626, and a number of controller interface control pages.

Figure 12:
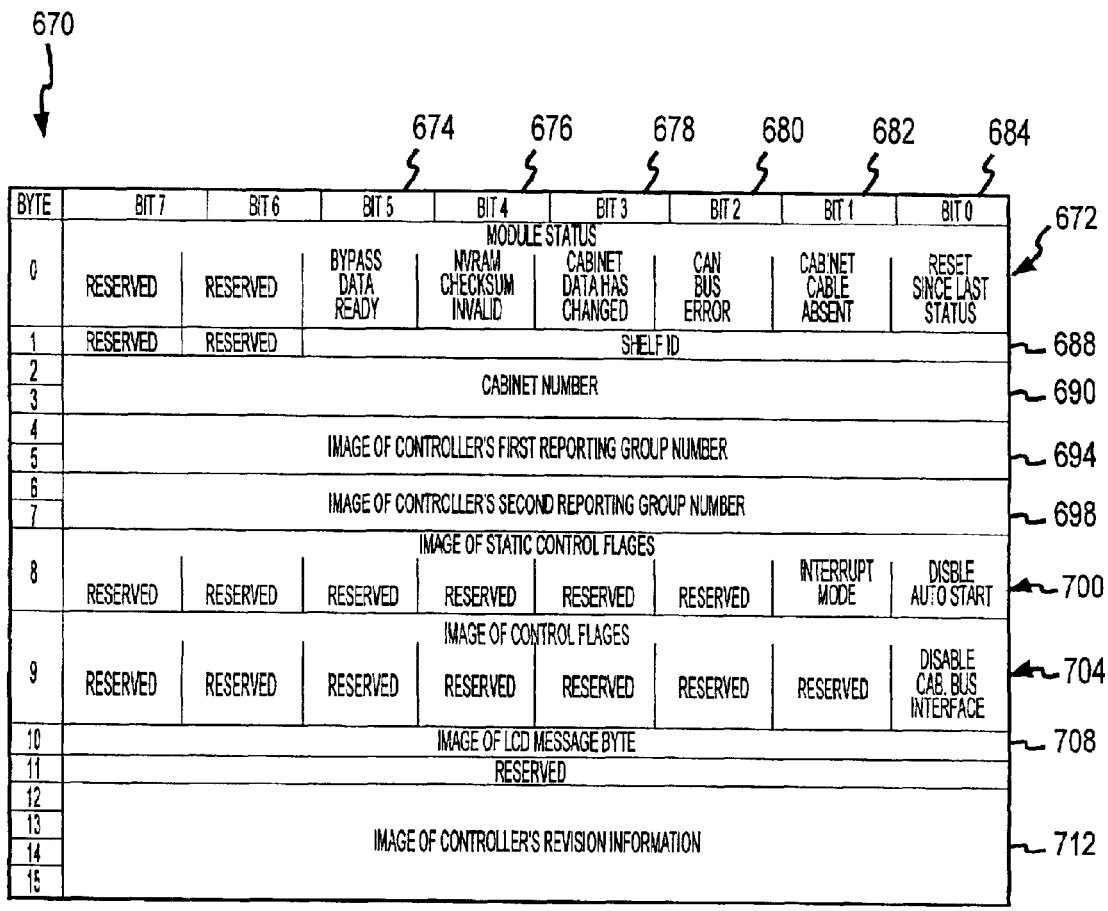
FIG. 12 is an exemplary data structure for a CBIC interface status page of the interfacing protocol data structure of FIG. 11.

The status pages provided may be used for providing and storing the present status of particular components within the controller 500 and/or within the reporting group to which the controller 500 belongs. Referring to FIG. 12, an exemplary status page 670 is illustrated for the controller interface status page 628. The page 670 is used to provide status information for the entire controller module 500. A module status field (or byte) 672 is included and divided into a number of status portions or bits. An interrupt signal 528 is transmitted from the cabinet bus interface controller 520 to interrupt the CPU 512 when any of the status bits are changed. The status bits include a bypass data ready bit 674 which is set when the data requested by either the controller interface drive bypass control page 656 or the controller interface drive bypass restart page 664 of FIG. 11 is complete. When data in the non-volatile RAM of the CPU 512 is corrupted or invalid, NVRAM checksum invalid 676 is set. When a shelf ID or cabinet number or ID is changed, bit 678 is set. A CAN bus error 680 is provided to indicate when an error is detected in the CANH or CANL signals 554, 558 that prevents communications with the other components in the cabinet over the cabinet bus. A cabinet cable absent bit 682 is provided to indicate when the cabinet bus is either not plugged in or is broken. Bit 684 is when the CPU 512 starts up after a reset and cleared when the module status 672 is read.

The controller interface status page 670 further includes a field 688 for storing the shelf ID for the controller 500 as determined from shelf ID signals 550. The cabinet number field 690 is provided to store the cabinet identifier provided by the cabinet EMU or as a default of zero. Fields 694 and 698 are provided for storing a first reporting group number for which the controller 500 belongs or is assigned to and a second reporting group number (for those embodiments in which a single controller 500 can operate more than one reporting group or to facilitate changing reporting groups).

Static and other control flag fields 700, 704 are provided with a number of control bits. An LCD message byte or field 708 is provided for storing an image of the message to be displayed on a cabinet or enclosure LCD panel. Field 712 is provided to include an image of the CPU 512 revision information that is to be transmitted over the cabinet bus.

FIG. 13 illustrates an exemplary data structure 720 for the controller interface page 628 used for indicating reporting group participation. The controller interface page 720 includes a questionable indication bit 722 that is set when one of the enclosures listed in the page 720 has questionable or problematic participation within the particular reporting group being controlled by the controller 500. The particular reporting group is indicated in reporting group number field 728 (often provided in the controller interface drive bypass restart control page 664). If the number of enclosures attempting to participate or being assigned to the reporting group exceeds a predetermined maximum number set for that reporting group listed in field 728, the table overflow bit 724 is set. A "failed" bit 726 is provided to indicate that an action could not be performed by the cabinet bus interface controller 520, such as on the controller interface drive bypass restart control page 664 or such as in response to the inclusion of an invalid reporting group number in field 728.

The reporting group participation controller interface page 720 further includes a number of fields 730 listing information for each of the enclosures in the reporting group being controlled by the controller 500 and identified by the identifier in reporting group number field 728. As shown, the enclosure number or identifier is provided for each enclosure as well as the cabinet number or identifier. The cabinet and enclosure numbers may be used by the cabinet bus interface controller 520 or controller 500 as target cabinet and enclosure numbers for messaging such as in the controller interface drive bypass control page 656. Additionally, the participating enclosure fields 730 include a field for indicating if there is a problem with the participation of a particular enclosure (e.g., participation is questionable which may occur when the cabinet bus interface controller 520 has been notified of the enclosure's participation in the reporting group but has not yet received adequate confirmation from the enclosure).

Figure 14:
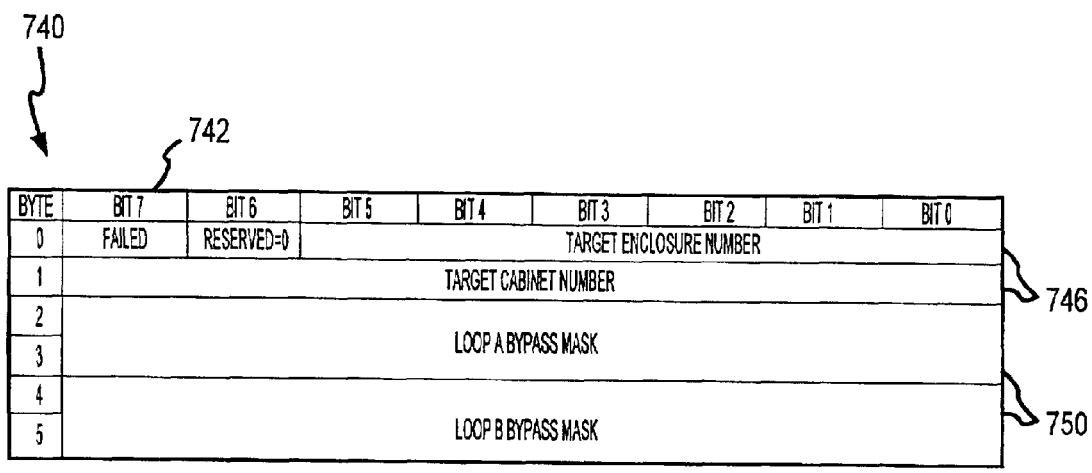
FIG. 14 is an exemplary data structure for a CBIC interface page for drive bypass status.

Referring again to FIG. 11, a controller interface status page 636 is provided to indicate the drive bypass status. An example of the arrangement and content of this page 636 is shown in FIG. 14. The illustrated controller interface drive bypass status page 740 includes a "failed" field for indicating (by setting the bit) that action could not be taken on the bypass request via the controller interface drive bypass control page 656, which may be caused by failure to establish the reporting group number using a preceding controller interface drive bypass restart control page 664. Fields 746 are provided to store information on the cabinet and enclosure numbers or other identifiers of the enclosure for which bypass masks are targeted. These identifiers are copied from the controller interface drive bypass control page 656 for which the page 740 is a response.

The bypass mask loop fields 750 contain information copied from the controller interface drive bypass control page 656 for which the page 740 is a response. The masks are typically modified to indicate the components for which a particular requested action cannot be taken. As a specific example, a request that is not granted to unbypass (bit=0) a component returns the mask with that bit set. Empty bays in the loop bypass masks return with the corresponding bit set. For example, referring to the enclosure 100 of FIG. 2, each disk or device 116 may be considered a bay on the data loop 108 and each device or bay is provided a field or position on the bypass masks 750 to indicate whether the device is being bypassed due to an actual or suspected malfunction (such as with a bit setting of 1). When a malfunctioning device is fixed or replaced, the mask is changed to stop bypassing the device on the loop (such as by setting the bay corresponding to the device to zero).

The controller interface protocol page 620 further includes a number of control pages 640, 644, 648, 652, 656, 660, and 664. The controller interface general control page 640 is used for among other purposes to indicate when the format of any of the data structures used in the controller interface is changed. The controller interface module control page 644 is used to provide control over the entire controller 500 module and may include a number of control flags that may be set. Specifically, a disable cabinet bus interface flag may be provided and when set, the CPU 512 ignores or does not listen to the communications on the cabinet bus via link 508. When this flag is cleared, the CPU 512 participates normally in all cabinet bus communications.

The controller interface LCD message control page 648 is provided and used such that when a message selection byte is written to this page the controller 500 operates to write the selected message on the cabinet's LCD panel by passing the selection signal to the cabinet EMU. The page 648 in effect causes a predefined message to be displayed to the cabinet's LCD panel (such as panel 249). Typically, the controller 500 does not modify the messages but only selects a message from a message set.

The controller interface non-volatile control page 652 is provided to allow non-volatile control information to be stored for later use by the controller 500. Generally, this page 652 includes a first (and optionally a second) reporting group number field for storing the reporting group assignment of the controller 500. The information in this field assigns the reporting group number to the controller 500 via CPU 512 (the value, such as a zero value, may also indicate that participation in a reporting group has been disabled). The non-volatile control page 652 may further include a set of static control flags. Typically, the entire static control bit mask is stored to non-volatile RAM when received, and the settings affect the startup behavior of the CPU 512 after a power up or after a reset of the controller 500. One of the static control flags may be used to indicate the interrupt mode and controls operation of the interrupt pins (such as used for signals 528) on the cabinet bus interface controller 520. This flag is used to inform the CPU 512 when the interrupt status mode has changed. The two modes of operation may be labeled "pulsed" and "clear on read." In the pulsed mode, when an interrupt signal 528 is generated one pulse (or signal 528) is provided for each interrupt condition. In the clear on read mode, the interrupt signal 528 is driven active continuously until the CPU 512 reads the status byte location. A disable autostart flag may also be provided and when set, the CPU 512 does not communicate with the cabinet bus via link 508 (which causes the disable cabinet bus interface control bit in the control flags 704 of controller interface status page 670 to be set). Once this flag is cleared and the non-volatile RAM data is determined valid, the CPU 512 again participates in communications on cabinet bus.

The controller interface drive bypass control page 656 is provided to allow the controller 500 to bypass selected devices on a malfunctioning data communication loop (such as on a fibre channel loop 216). This feature is useful for restoring the data communication loop functionality while isolating a problem device or enclosure causing the malfunction. The controller interface drive bypass status page 636 (shown in FIG. 14) is generated in response to this control page 656. The page 656 includes a target enclosure number and a target cabinet number for the enclosure for which the bypass masks are targeted (e.g., the malfunction or suspected problem device). These numbers may be taken from the list of enclosures in the controller interface reporting group participation page (shown in FIG. 13) 632. The page 656 further includes bypass masks for the data communication loops (typically a first and second fibre channel loop). The enclosure for which the bypass masks are targeted must be participating in the reporting group specified by a preceding controller interface drive bypass restart page 664.

The controller interface revision information control page 660 is provided to allow the CPU 512 to set the revision information transmitted over the cabinet bus. The controller interface drive bypass restart control page 664 allows identification of participants in a reporting group on a malfunctioning data communication or fibre channel loop, which is the important first step in isolating a failed component which is causing the loop to malfunction. The page 664 typically includes a reporting group number of the reporting group for which functionality is being restored. This reporting group number identifies the reporting group operated upon by the controller interface drive bypass control page 656, the controller interface reporting group participation status page 632, and the controller interface drive bypass status page 636. The collection of information regarding participation in the given reporting group begins upon receipt of this page 664 and continues for a predetermined minimum of time (such as 4 seconds). After this minimum data collection time and all questionable entries have been eliminated from the list of participants, the controller interface reporting group participation status page 632 is generated. If all questionable entries cannot be eliminated within a set timeout period (stored in the page 664), the list of participating enclosures or devices is generated with any questionable entries marked. The maximum amount of time for which information about reporting group participation is to be collected is labeled a timeout period.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed.

We claim:

1. A first controller for positioning on a shelf of a data storage cabinet in a mass storage system having a plurality of reporting groups, comprising:

an interface to a data communication loop for a reporting group, said loop linked to device enclosures each including a plurality of data devices and an enclosure processor, wherein the interface is adapted for transmitting control commands onto the data communication loop;

a cabinet bus interface controller linked to a cabinet bus in the data storage cabinet and adapted to receive enclosure reporting messages from the device enclosures including environmental information for the device enclosures and to transmit a subenclosure message including environmental information for the first controller; and a processor for creating the control commands and the subenclosure message, wherein the control commands are addressed to one of the device enclosures designated as a primary reporting device designated by the processor.

2. The first controller of claim 1, wherein the processor functions to change the primary reporting device designation to a different one of the device enclosures.

3. The first controller of claim 1, wherein at least one of the device enclosures is positioned in a data storage cabinet differing from the data storage cabinet housing the first controller and wherein the two data storage cabinets are communicatively-linked with a cabinet communication network, the different data storage cabinet including a cabinet bus linked to the cabinet communication network to provide a communication path for the enclosure reporting messages from at least one of the device enclosures.

4. The first controller of claim 1, wherein the cabinet bus interface controller is configured to receive cabinet identification and shelf identification signals from the cabinet bus and to determine a shelf identifier from the shelf identification signals and wherein the subenclosure messages include the shelf identifier and the cabinet identification.

5. The first controller of claim 1, wherein the enclosure reporting messages comprise SCSI-3 Enclosure (SES) data.

6. The first controller of claim 1, wherein the cabinet bus interface controller emulates a memory image to the processor including read only memory, non-volatile read and write memory, and read and write memory.

7. The first controller of claim 6, wherein the read only memory includes a shelf identifier field for storing a shelf identifier for the first controller and a cabinet number field for storing a cabinet identifier for the data storage cabinet.

8. The first controller of claim 6, wherein the cabinet bus interface controller transmits interrupt signals to the processor based on changes to the memory image.

9. A method of controlling communications in a data storage complex containing a plurality of reporting groups, comprising:

providing a controller including a processor for creating and transmitting control commands and a cabinet bus interface controller for providing an interface between the processor and other devices in one of the plurality of reporting groups within the storage complex, said cabinet bus interface controller including a data structure for storing a reporting group assignment for the controller; and communicatively linking the controller to a plurality of enclosures with a data communication loop and with a cabinet bus, wherein the control commands are transmitted over the data communication loop and wherein environmental status messages are received by the controller over the cabinet bus, wherein the cabinet bus interface controller is configured to determine whether the environmental status messages on the cabinet bus originate from one of the enclosures assigned to said one of the plurality of reporting groups.

10. The method of claim 9, further including determining with the cabinet bus interface controller from signals on the cabinet bus a shelf position of the controller within a cabinet in the data storage complex.

11. The method of claim 9, further including determining ones of the enclosures participating in the said one of the plurality of reporting groups.

12. The method of claim 9, wherein each of the enclosures includes a plurality of devices linked to the data communication loop and further including bypassing malfunctioning ones of the devices on the data communication loop.

13. The method of claim 12, wherein the bypassing is performed on a targeted one of the enclosures within a targeted cabinet in the data storage complex.

14. A system for data communication management comprising:
- a plurality of devices stored within a data storage cabinet, said devices grouped into a plurality of reporting groups;
- a data communication loop for transmitting control commands to and receiving control information from said plurality of devices within each reporting group;
- a host for controlling said devices via said data communication loop in response to said control information received from said devices; and
- a controller having a cabinet bus interface controller linked to a cabinet bus in the data storage cabinet and adapted to receive enclosure reporting messages from the plurality of devices and a processor that functions to designate the primary reporting device, wherein the controller is coupled to said host and said data communication loop, wherein said controller controls said devices in response to commands received from said GUI host, said commands addressed to one of the plurality of devices designated as a primary reporting device.

15. The system as set forth in claim 14, wherein the enclosure reporting messages comprise SCSI-3 Enclosure (SES) data.

16. The system as set forth in claim 14, wherein the cabinet bus interface controller emulates a memory image to the processor including read only memory, non-volatile read and write memory, and read and write memory.

17. The system as set forth in claim 16, wherein the read only memory includes a shelf identifier field for storing a shelf identifier for the controller and a cabinet number field for storing a cabinet identifier for the data storage cabinet.

18. The system as set forth in claim 16, wherein the cabinet bus interface controller transmits interrupt signals to the processor based on changes to the memory image.

19. A first controller for positioning on a shelf of a data storage cabinet in a mass storage system, comprising:
- an interface to a data communication loop linked to device enclosures each including a plurality of data devices and an enclosure processor, wherein the interface is adapted for transmitting control commands onto the data communication loop addressed to one of the device enclosures that is designated as a primary reporting device;
- a cabinet bus interface controller linked to a cabinet bus in the data storage cabinet and adapted to receive enclosure reporting messages from the device enclosures including environmental information for the device enclosures and to transmit a subenclosure message including environmental information for the first controller; and
- a processor for creating the control commands and the subenclosure message, wherein the processor designates the primary reporting device.

20. The first controller of claim 19, wherein the processor functions to change the primary reporting device designation to a different one of the device enclosures.

21. The first controller of claim 19, wherein at least one of the device enclosures is positioned in a data storage cabinet differing from the data storage cabinet housing the first controller and wherein the two data storage cabinets are communicatively-linked with a cabinet communication network, the different data storage cabinet including a cabinet bus linked to the cabinet communication network to provide a communication path for the enclosure reporting message from at least one of the device enclosures.

22. The first controller of claim 19, wherein the cabinet bus interface controller is configured to receive cabinet identification and shelf identification signals from the cabinet bus and to determine a shelf identifier from the shelf identification signals and wherein the subenclosure message includes the shelf identifier and the cabinet identification.

23. The first controller of claim 19, wherein the enclosure reporting messages comprise SCSI-3 Enclosure (SES) data.

24. A The first controller of claim 19, wherein the cabinet bus interface controller emulates a memory image to the processor including read only memory, non-volatile read and write memory, and read and write memory.

25. The first controller of claim 24, wherein the read only memory includes a shelf identifier field for storing a shelf identifier for the controller and a cabinet number field for storing a cabinet identifier for the data storage cabinet.

26. The first controller of claim 24, wherein the cabinet bus interface controller transmits interrupt signals to the processor based on changes to the memory image.

27. A method of controlling communications in a data storage complex, comprising:
- providing a first controller including a processor for creating and transmitting control commands and a cabinet bus interface controller for providing an interface between the processor and other devices in the data storage complex; and
- communicatively linking the controller to a plurality of enclosures with a data communication loop and with a cabinet bus,
- wherein the control commands are transmitted over the data communication loop and wherein environmental status messages are received by the controller over the cabinet bus, and wherein the CBI controller includes a data structure for storing a reporting group assignment defining a reporting group for the first controller and wherein the CBI controller is configured to determine whether the environmental status messages on the cabinet bus originate from one of the enclosures assigned to the reporting group.

28. The method of claim 27, further including determining with the CBI controller a shelf position of the first controller within a cabinet in the data storage complex from signals on the cabinet bus.

29. The method of claim 27, further including determining which enclosures of the plurality of enclosures participate in the reporting group.

30. The method of claim 27, wherein each of the enclosures includes a plurality of devices linked to the data communication loop and the method further includes bypassing devices that are malfunctioning on the data communication loop.

31. The method of claim 30, wherein the bypassing is performed on a targeted one of the enclosures within a targeted cabinet in the data storage complex.

* * * * *

UNITED STATES PATENT AND TRADEMARK OFFICE
CERTIFICATE OF CORRECTION

PATENT NO.        : 6,920,511 B2                                          Page 1 of 1
APPLICATION NO.   : 10/086599
DATED             : July 19, 2005
INVENTOR(S)       : Stephen J. Sicola et al.

It is certified that error appears in the above-identified patent and that said Letters Patent is hereby corrected as shown below:

In column 28, line 15, in Claim 24, delete "A" before "The".

In column 28, line 30, in Claim 27, before "controller" insert -- (CBI) --.

Signed and Sealed this

Twenty-seventh Day of July, 2010

David J. Kappos
*Director of the United States Patent and Trademark Office*